(12) United States Patent
Dalla Betta et al.

(10) Patent No.: US 7,610,752 B2
(45) Date of Patent: Nov. 3, 2009

(54) DEVICES AND METHODS FOR REDUCTION OF $NO_X$ EMISSIONS FROM LEAN BURN ENGINES

(75) Inventors: Ralph Albert Dalla Betta, Mountainview, CA (US); Joel M. Cizeron, Sunnyvale, CA (US); David R. Sheridan, Menlo Park, CA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/715,854

(22) Filed: Mar. 8, 2007

(65) Prior Publication Data

US 2007/0151232 A1 Jul. 5, 2007

Related U.S. Application Data

(62) Division of application No. 10/715,722, filed on Nov. 17, 2003, now Pat. No. 7,181,906.

(60) Provisional application No. 60/426,604, filed on Nov. 15, 2002.

(51) Int. Cl.
*F01N 3/00* (2006.01)

(52) U.S. Cl. .............................. 60/286; 60/274; 60/287; 60/295; 60/301; 60/303; 48/197 R; 48/198.7

(58) Field of Classification Search .................. 60/274, 60/286, 287, 288, 295, 297, 300, 301, 303; 48/197 R, 198.1, 198.3
See application file for complete search history.

(56) References Cited

U.S. PATENT DOCUMENTS

| | | | |
|---|---|---|---|
| 5,183,401 A | 2/1993 | Dalla Betta et al. | |
| 5,232,357 A | 8/1993 | Dalla Betta et al. | |
| 5,250,489 A | 10/1993 | Dalla Betta et al. | |
| 5,259,754 A | 11/1993 | Dalla Betta et al. | |
| 5,412,946 A | 5/1995 | Oshima et al. | |
| 5,441,401 A | 8/1995 | Yamaguro et al. | |
| 5,458,857 A | 10/1995 | Collins et al. | |
| 5,512,250 A | 4/1996 | Betta et al. | |
| 5,921,076 A | 7/1999 | Krutzsch et al. | |
| 5,950,932 A | 9/1999 | Takeda et al. | |
| 5,968,463 A | 10/1999 | Shelef et al. | |
| 5,979,866 A | 11/1999 | Baxter et al. | |
| 6,109,018 A | 8/2000 | Rostrup-Nielsen et al. | |
| 6,161,378 A | 12/2000 | Hanaoka et al. | |
| 6,165,633 A | 12/2000 | Negishi | |

(Continued)

FOREIGN PATENT DOCUMENTS

DE  10018792  9/2001

(Continued)

*Primary Examiner*—Binh Q. Tran
(74) *Attorney, Agent, or Firm*—Paul V. Keller

(57) ABSTRACT

The invention provides devices and methods for generating $H_2$ and CO in an $O_2$ containing gas stream. The invention also provides devices and methods for removal of $NO_X$ from an $O_2$ containing gas stream, particularly the oxygen-rich exhaust stream from a lean-burning engine, such as a diesel engine. The invention includes a fuel processor that efficiently converts added hydrocarbon fuel to a reducing mixture of $H_2$ and CO. The added fuel may be a portion of the onboard fuel on a vehicle. The $H_2$ and CO are incorporated into the exhaust stream and reacted over a selective lean $NO_X$ catalyst to convert $NO_X$ to $N_2$. thereby providing an efficient means of $NO_X$ emission control.

19 Claims, 10 Drawing Sheets

U.S. PATENT DOCUMENTS

| | | |
|---|---|---|
| 6,167,696 B1 | 1/2001 | Maaseidvaag et al. |
| 6,168,098 B1 | 1/2001 | Brinn, Jr. |
| 6,174,504 B1 | 1/2001 | Silver et al. |
| 6,176,078 B1 | 1/2001 | Balko et al. |
| 6,202,407 B1 | 3/2001 | Brusasco et al. |
| 6,267,792 B1 | 7/2001 | Nagamiya et al. |
| 6,449,947 B1 | 9/2002 | Liu et al. |
| 6,454,192 B2 | 9/2002 | Perry |
| 6,508,057 B1 | 1/2003 | Bouchez et al. |
| 6,521,204 B1 * | 2/2003 | Borup et al. ............. 423/652 |
| 6,527,980 B1 | 3/2003 | Roden et al. |
| 6,557,342 B2 | 5/2003 | Suga et al. |
| 6,560,958 B1 | 5/2003 | Bromberg et al. |
| 6,576,203 B2 | 6/2003 | Abe et al. |
| 6,641,795 B2 | 11/2003 | Abe |
| 6,698,188 B2 | 3/2004 | Irisawa et al. |
| 6,698,190 B2 * | 3/2004 | Docter et al. ............. 60/285 |
| 6,708,484 B2 | 3/2004 | Onodera et al. |
| 6,713,040 B2 | 3/2004 | Ahmed et al. |
| 6,823,662 B1 * | 11/2004 | Yamamoto et al. ............. 60/286 |
| 6,843,054 B2 * | 1/2005 | Taylor et al. ............. 60/275 |
| 6,845,610 B2 * | 1/2005 | Shiino et al. ............. 60/286 |
| 6,869,456 B2 | 3/2005 | Salemi et al. |
| 6,869,580 B2 | 3/2005 | Wojtowicz et al. |
| 7,082,753 B2 | 8/2006 | Dalla Betta et al. |
| 7,135,154 B2 | 11/2006 | Deshpande |
| 7,165,393 B2 | 1/2007 | Dalla Betta et al. |
| 7,181,906 B2 | 2/2007 | Dalla Betta et al. |
| 7,188,469 B2 * | 3/2007 | Bonadies et al. ............. 60/286 |
| 7,386,977 B2 * | 6/2008 | Ancimer et al. ............. 60/286 |
| 2001/0041153 A1 | 11/2001 | Benz |
| 2002/0031690 A1 | 3/2002 | Shimazu et al. |
| 2002/0038542 A1 | 4/2002 | Akama et al. |
| 2002/0041986 A1 | 4/2002 | Wojtowicz et al. |
| 2002/0062641 A1 | 5/2002 | Shiino et al. |
| 2002/0083646 A1 | 7/2002 | Deshpande et al. |
| 2002/0090326 A1 | 7/2002 | Deshpande |
| 2002/0090334 A1 | 7/2002 | Stevens et al. |
| 2002/0094310 A1 | 7/2002 | Krause et al. |
| 2002/0098129 A1 | 7/2002 | Martin et al. |
| 2002/0108309 A1 | 8/2002 | Grieve et al. |
| 2002/0121461 A1 | 9/2002 | Ueda et al. |
| 2003/0070425 A1 | 4/2003 | Kokusyo et al. |
| 2003/0101713 A1 | 6/2003 | Dalla Betta et al. |
| 2004/0006975 A1 | 1/2004 | Stroia et al. |
| 2004/0043343 A1 | 3/2004 | Kamijo |
| 2004/0050037 A1 | 3/2004 | Betta et al. |
| 2004/0101720 A1 | 5/2004 | Ogawa |
| 2004/0131540 A1 | 7/2004 | Fujii et al. |
| 2004/0187483 A1 | 9/2004 | Dalla Betta et al. |
| 2005/0089732 A1 | 4/2005 | Aoyama et al. |
| 2005/0191531 A1 | 9/2005 | Wojtowicz et al. |
| 2005/0217178 A1 | 10/2005 | Aoyama |
| 2006/0230748 A1 | 10/2006 | Dalla Betta et al. |
| 2006/0254141 A1 | 11/2006 | Krause et al. |

FOREIGN PATENT DOCUMENTS

| | | |
|---|---|---|
| DE | 20218811 U1 | 4/2003 |
| EP | 08931542 | 1/1999 |
| JP | 63-68714 | 8/1988 |
| JP | 03196839 | 8/1991 |
| JP | 09317440 | 12/1997 |
| WO | WO 2001/034950 | 5/2001 |

* cited by examiner

DEVICES AND METHODS FOR REDUCTION OF $NO_x$ EMISSIONS FROM LEAN BURN ENGINES

CROSS REFERENCE TO RELATED APPLICATIONS

This application is a divisional of U.S. application Ser. No. 10/715,722 filed Nov. 17, 2003, which claims the benefit of U.S. Provisional Application No. 60/426,604, filed on Nov. 15, 2002.

FIELD OF THE INVENTION

This invention relates to reduction of $NO_x$ emissions from a combustion process. The invention also relates to removal of $NO_x$ from the exhaust from an internal combustion engine, particularly a lean burn internal combustion engine, such as a diesel engine. The invention also relates to fuel processing, whereby a hydrocarbon fuel is converted into a reducing gas mixture containing $H_2$ and $CO$, and use of the $H_2$ and $CO$ to reduce $NO_x$ in an oxygen-rich exhaust stream.

BACKGROUND OF THE INVENTION

Emissions regulations are continually being tightened to improve air quality in many locations around the world. Over the past 30 years, the regulations relating to spark ignited engines have been tightened and the allowable emissions substantially reduced. These engines operate at or near a stoichiometric air/fuel ratio and as a result three-way catalyst technology has been developed to control the emissions of carbon monoxide (CO), unburned hydrocarbons (UHC), and nitrogen oxides ($NO_x$), including both NO and $NO_2$. Three-way catalyst technology is not applicable to lean burn engines because the large excess of oxygen in the exhaust mixture impedes the reduction of $NO_x$. This is particularly a problem with diesel engines or compression ignition engines which have very high emissions of $NO_x$ and particulate matter (PM). Coupled with this is the drive within the U.S. and much of the world for increased fuel efficiency. Diesel engines are very efficient and therefore a desirable power source for vehicles. However, the high emissions must be reduced to comply with statutory requirements. To reach the emissions levels required for gasoline spark ignited engines, the emissions from a modern diesel engine must be reduced by a factor of 10 to 50, depending on the engine.

Lean-burn engines include both spark-ignition (SI) and compression-ignition (CI) engines. Lean-burn SI engines offer 20-25% greater fuel economy and CI engines offer 50% and sometimes higher fuel economy than equivalent conventional SI engines. CI engines are widely used in heavy-duty vehicles, and their use in light-duty vehicles is small but expected to grow. They are also widely used in stationary applications, such as electric power generators.

Current automotive emission control technology is based largely on catalytic converters with three-way catalysts (TWCs). This technology is highly effective for ordinary gasoline engines that operate at nearly stoichiometric air/fuel ratios. However, as discussed above, it is incompatible with lean-burn engines due to the excess of oxygen in the exhaust. This incompatibility is a major limitation of both lean-burn engines and TWC-based emission control technology. In the case of diesel engines, the emission control system must remove $NO_x$ and PM from an exhaust stream containing about 6-15% oxygen.

Many different technologies have been investigated for $NO_x$ removal from lean-burn engine exhaust. One successful technology has been the selective reduction of $NO_x$ with ammonia ($NH_3$) as a reducing agent. Ammonia is added to the exhaust stream in an amount proportionate to the amount of $NO_x$. The exhaust stream containing $NO_x$ and $NH_3$ is then passed over a catalyst upon which the $NO_x$ and $NH_3$ selectively react to produce $N_2$. This technology, referred to as Selective Catalytic Reduction (SCR), is widely used in gas turbines and large boilers and furnaces, and is capable of achieving very high $NO_x$ conversion to $N_2$. However, one disadvantage of this technology is that it requires a source of $NH_3$ which can be either liquid $NH_3$ stored under high pressure or an aqueous solution of urea which decomposes prior to or on the SCR catalyst to produce ammonia. In general $NH_3$—SCR technology is limited to large stationary applications, due to its cost and the need for a source of $NH_3$. In addition, the addition of $NH_3$ must be carefully controlled to achieve a desired $NH_3/NO_x$ ratio, to prevent excess $NH_3$ from being exhausted to the atmosphere and adding to the level of air pollutants. Another disadvantage is the need to develop the rather costly infrastructure to supply ammonia or urea to vehicles using this technology. For these reasons, this technology is not the preferred approach to $NO_x$ control on vehicles or very small systems that may be located in populated areas.

Another technology that has been explored for $NO_x$ abatement from lean-burning mobile sources is a $NO_x$ storage and reduction (NSR) system, as described in Society of Automotive Engineers papers SAE-950809 and SAE-962051, and in U.S. Pat. No. 6,161,378. The NSR system has an adsorbent-catalyst unit situated in the exhaust system and through which the exhaust stream flows. This catalyst unit provides two functions: reversible $NO_x$ storage or trapping, and $NO_x$ reduction. During normal engine operation, while the exhaust gas flows through the system, $NO_x$ is adsorbed onto the adsorbent in the presence of excess oxygen during the Adsorption Cycle. As the adsorbent component becomes saturated with $NO_x$, the adsorption becomes less complete and the $NO_x$ exiting the $NO_x$ trap begins to increase. At this point, the composition of the exhaust stream is changed from an oxidizing to a reducing state. This requires reduction of the oxygen level to zero and introduction of a reducing agent. In the reducing environment, the $NO_x$ is desorbed from the adsorbent and then reduced to nitrogen by the catalytic components that are incorporated into the adsorbent-catalyst unit. This reaction is generally very quick. Thus, the reduction part of the cycle can be very short, but must be sufficiently long to regenerate a significant fraction of the $NO_x$ adsorption capacity. The exhaust composition is then reverted to normal oxidizing conditions, and the cycle is repeated. There are several disadvantages to this technology. One problem is that converting the exhaust to reducing conditions is difficult to achieve for a lean-burn engine such as a diesel engine designed to run with 8 to 15% $O_2$ in the exhaust stream. Another problem is that the adsorbent-catalyst components that have been investigated form very stable sulfates, resulting in poisoning of the catalyst by sulfur in the fuel. Regeneration of the catalyst to remove the sulfur is very difficult and results in degradation of the catalyst performance.

A promising approach to $NO_x$ removal from exhaust streams containing excess $O_2$ is selective catalytic reduction of the $NO_x$ with a reducing agent such as CO or an added hydrocarbon, using a catalyst called a selective lean $NO_x$ catalyst ("lean $NO_x$ catalyst") Such catalysts have been extensively investigated over the last 20 years (see, for example, Shelef (1995) *Chem. Rev.* 95:209-225, and U.S. Pat.

No. 5,968,463). Previously, hydrocarbons have been used as the reducing agent, with the rationale that this component would be available from the engine fuel. In general, in engine tests using a lean $NO_X$ catalyst, when a reactive hydrocarbon is used as the sole reducing agent or fuel is injected into a diesel engine in such a manner as to produce reactive hydrocarbon species, the level of $NO_X$ control is low, in the range of 20-50%.

Hydrogen has also been found to be a good reducing agent for the selective reduction of $NO_X$ to $N_2$. For example, Costa, et al. (2001) *J. Catalysis* 197:350-364, report high activity of $H_2$ as a reducing agent for catalytic reduction of $NO_X$ in the presence of excess $O_2$ at low temperatures (150-250° C.), with good utilization of the $H_2$. EP 1,094,206A2 also describes beneficial results associated with addition of $H_2$ to a hydrocarbon reducing agent in a lean $NO_X$ catalyst system, resulting in greater than 95% $NO_X$ removal in engine dynometer testing. $H_2/CO$ mixtures have also been found to be good reducing agents in such systems.

Although $H_2$ and $H_2/CO$ mixtures are good reducing agents for continuous removal of $NO_X$ from an $O_2$-containing exhaust stream, present methods for delivering these reducing agents for use in a small mobile system such as a vehicle are cumbersome and/or expensive. Hydrogen is difficult to store and $H_2$ refueling stations are currently not available. On-board manufacturing of $H_2$ or $H_2/CO$ mixtures from diesel fuel is possible, but difficult and costly.

An example of a system for on-board generation of a reducing agent for $NO_X$ reduction may be found in WO 01/34950, which describes a partial oxidation system that uses air and the on-board hydrocarbon fuel to generate a reducing mixture that is added to the exhaust stream. The exhaust stream, which contains $NO_X$, and the added reducing agent are then reacted over a catalyst that reduces the $NO_X$ in the presence of excess $O_2$. A disadvantage with such a device is that it may be difficult to operate for an extended period of time due to formation of coke, which ultimately poisons the catalyst. Also, this system produces low molecular weight hydrocarbons, which are less effective reducing agents for $NO_X$ than $H_2$. Another system has been described in U.S. Pat. No. 6,176,078 that involves use of a plasmatron to produce low molecular weight hydrocarbons and $H_2$ from hydrocarbon fuel. Disadvantages with this system include high energy cost, cost of the system including electronics for the plasma generator and durability issues. U.S. Pat. No. 5,441,401 and EP 0,537,968A1 describe use of a separate $H_2$ generator with a separate air and water intake. Since the water is vaporized and passes through the catalyst, it must be very pure. This would require separate tanks, supply system and complexity. However, this system may be difficult to implement and too complex for $NO_X$ removal in mobile systems such as a vehicle. Another well-known technology includes an autothermal reformer (ATR) with a heat exchanger and water feed pumps. However, such a system is difficult to scale down. In addition, these processes that convert the liquid hydrocarbon fuel to $H_2$ and CO in a separate reactor system can have a long start up time, from 1 to 30 minutes. This would result in a long period of time during which no reducing agent is available for NOx reduction and vehicle NOx emissions levels would remain unacceptably high.

Both $O_2$ and $H_2O$ may be used to convert a hydrocarbon fuel such as diesel fuel to $H_2$ and CO, through reactions such as partial oxidation and steam reforming in the presence of an appropriate catalyst. One approach that has previously been used for processing a hydrocarbon fuel to produce $H_2$ and CO is to add the fuel continuously to a gas stream upstream of a catalyst, which then converts the fuel to $H_2$ and CO when the fuel-containing gas stream contacts the catalyst. However, the disadvantage of continuous fuel addition is that the high level of $O_2$ in the exhaust stream results in a very high temperature at a fuel-to-oxygen ratio that is good for reforming the fuel to $H_2$ and CO. This is depicted schematically in FIG. 1. FIG. 1 depicts the reactor temperature over time at various equivalence ratios ($\Phi$). As fuel is added to an oxygen containing gas stream, for example a diesel exhaust containing 10% $O_2$, combustion of the fuel results in heat release and an increase in temperature. Thus, at an equivalence ratio of 0.2, the exhaust gas would increase in temperature from about 250° C. to about 500° C. At an equivalence ratio of 0.5, the temperature would be 820° C., and at an equivalence ratio of 1.0, the temperature would be 1230° C. As the equivalence ratio rises above 1, the temperature decreases due to endothermic reforming reactions. Thus, at an equivalence ratio of 2, the temperature would be 1042° C., and at an equivalence ratio of 3, a very rich mixture, the temperature would be 845° C. Typical auto-thermal reformers, which regulate temperature isothermally by using combustion (an exothermic reaction) to supply the heat for steam reforming (an endothermic reaction), operate with an equivalence ratio in the range of 3 to 4, with a high level of steam (at least 30%) to increase the steam to carbon ratio ($S/C_1$) to a value above 1 and dilute the concentration of $O_2$. Addition of steam is necessary in such a system to prevent coke formation (carbon deposition) on the catalyst. However, addition of steam is not desirable because this water must be carried on the vehicle as a feed for the fuel processing system and the water would have to be very pure since typical impurities in tap water such as sodium, calcium, magnesium etc. are poisons for most reforming catalyst materials.

BRIEF SUMMARY OF THE INVENTION

The invention provides devices, methods, and compositions for production of reductant from a fuel in an oxygen containing gas stream, and reduction of $NO_X$ emissions in an oxygen containing exhaust stream.

In one aspect, the invention provides a device for producing reductant. The device includes a fuel processor and a catalytic zone having an oxidation catalyst and a reforming catalyst, wherein the fuel injector is configured to inject fuel into at least a portion of an oxygen containing gas stream upstream from the catalytic zone to provide rich and lean zones in the gas stream when the gas stream flows through the catalytic zone. In one embodiment, the device is configured such that as a rich zone in an oxygen containing gas stream flows through the catalytic zone in a direction from the inlet to the outlet of the catalytic zone, a portion of the fuel in the rich zone is oxidized on the oxidation catalyst and at least a portion of the remaining fuel in the rich zone is reformed on the reforming catalyst, thereby producing a reducing gas stream. In a rich zone of the oxygen containing gas stream, a portion of the added hydrocarbon fuel is oxidized on the oxidation catalyst to consume substantially all (i.e., greater than about 90%) of the oxygen and the remaining fuel is converted to reductant, e.g., $H_2$ and CO when a hydrocarbon fuel is used, on the reforming catalyst, thereby producing a reducing gas stream. The device may further comprise a reservoir containing a hydrocarbon fuel, wherein the reservoir is in fluid communication with the fuel injector and wherein the reducing gas stream includes $H_2$ and CO.

In one embodiment, a lean zone does not include added fuel. In another embodiment, a lean zone includes some fuel at an equivalence ratio less than 1. In embodiments in which lean zones contain some fuel, preferably essentially all of the added fuel in the lean zone is oxidized on the oxidation catalyst as the lean zone flows through the catalytic zone or is oxidized on a pre-oxidation catalyst as described below.

In some embodiments, the oxidation catalyst and the reforming catalyst are the same composition. In other embodiments, the oxidation catalyst and the reforming catalyst are different compositions.

Creation of rich and lean zones in the gas stream may be accomplished by discontinuous injection of fuel to form rich and lean regions in the gas stream. In one embodiment, the fuel injector is adapted to introduce the hydrocarbon fuel to an oxygen containing gas stream discontinuously to form alternating rich and lean zones. Often, the duration of fuel addition to form a rich zone and a lean zone includes a rich-lean period, wherein the rich-lean period repeats every 0.1 to 10 seconds, and wherein the rich portion of the rich-lean period extends over about 10 to about 90% of the rich-lean period.

Alternatively, rich and lean zones may be created by injecting fuel essentially continuously, with rich and lean zones formed by moving either the catalytic zone or the fuel injector relative to the flow of the gas stream, or by changing the spray angle of fuel injection such that a varying portion of the catalytic zone receives a gas stream with added fuel. In one embodiment, the fuel injector is adapted to introduce the fuel to a portion of an oxygen containing gas stream essentially continuously to form a rich zone, and the device is configured such that the portion of the catalytic zone through which the rich zone flows varies over time.

In some embodiments, the fuel injected by the fuel injector is any hydrocarbon compound that can be oxidized or any hydrocarbon compound that can be reduced. In some embodiments, the hydrocarbon fuel is a gaseous, liquid, oxygenated, nitrogen containing, or sulfur containing hydrocarbon, or a mixture thereof. In other embodiments, the hydrocarbon fuel is gasoline or diesel fuel, or a mixture thereof.

In some embodiments, the catalytic zone includes at least one monolithic structure. Often, the oxidation and reforming catalysts are applied to surfaces of the monolithic structure as a washcoat, either separately or combined. In some embodiments, the oxidation and reforming catalysts are applied to the same area of the monolithic structure. In other embodiments, the oxidation and reforming catalysts are applied to different areas of the structure. In one embodiment, the oxidation catalyst is applied to an area that is upstream of the reforming catalyst. In some embodiments, the monolithic structure includes a plurality of channels from the inlet face to the outlet face. In one embodiment the monolithic structure includes metal. In another embodiment, the monolithic structure includes a ceramic material.

In some embodiments, the device is configured such that when rich and lean zones of an oxygen containing gas stream flow through the catalytic zone, the temperature of the catalytic zone is maintained at about 450 to about 1000° C.

In one embodiment, the gas stream is heated prior to entry into the inlet of the catalytic zone by a heater or a heat exchanger upstream from the catalytic zone, wherein the heater or heat exchanger is in gas flow communication with the catalytic zone.

In a still further embodiment, the device includes a pre-oxidation catalyst downstream from the fuel injector and upstream from the catalytic zone of the fuel processor. The pre-oxidation catalyst includes an oxidation catalyst and the fuel injector is configured to introduce a fuel into at least a portion of a gas stream flowing through the pre-oxidation catalyst, such that when the gas stream flows through the pre-oxidation catalyst, at least a portion of the fuel introduced by the fuel injector is oxidized, thereby heating the gas stream. In one embodiment of a device with a pre-oxidation catalyst, the device includes a mixer downstream from the pre-oxidation catalyst and upstream from the catalytic zone, and the device is configured such that a portion of the fuel introduced by the fuel injector and flowing through the pre-oxidation catalyst is vaporized, and wherein the mixer is configured to mix the vaporized fuel in the gas stream in a predominantly radial fashion without substantial axial mixing. In one embodiment of a device with a pre-oxidation catalyst, the pre-oxidation catalyst is coated on at least a portion of the inner walls of a fraction of the channels of a monolithic catalyst structure. In one embodiment, the fraction of channels containing the coated catalyst is about 20 to about 80%.

In another aspect, the invention provides a device for reducing $NO_X$ content in oxygen-containing emissions of a lean burn engine. The device includes a fuel injector and a first catalytic zone that includes an oxidation catalyst and a reforming catalyst. The fuel injector is configured to inject fuel into at least a portion of the oxygen containing exhaust stream from a lean burn engine upstream from the catalytic zone to provide rich and lean zones in the exhaust stream when the exhaust stream flows through the first catalytic zone. The device further includes a second catalytic zone downstream from the first catalytic zone that includes a catalyst capable of reducing $NO_X$ to $N_2$ in the presence of a reducing gas. In one embodiment, the device is configured such that as a rich zone in an oxygen containing gas stream flows through the first catalytic zone, a portion of the fuel in the rich zone is oxidized on the oxidation catalyst and at least a portion of the remaining fuel in the rich zone is reformed on the reforming catalyst, thereby producing a reducing gas stream, and wherein the device is configured such that at least a portion of the exhaust stream and at least a portion of the reducing gas stream produced in the first catalytic zone flow through the second catalytic zone, such that when the exhaust stream and reducing gas streams flow through the second catalytic zone, $NO_X$ is reduced to $N_2$ on the catalyst contained therein.

In some embodiments, lean zones do not contain added fuel. In other embodiments, lean zones contain some added fuel at an equivalence ratio less than 1. In embodiments in which lean zones contain some added fuel, preferably essentially all of the added fuel in a lean zone is oxidized on the oxidation catalyst in the first catalytic zone or on a pre-oxidation catalyst as described above.

The device may further include a reservoir that includes a hydrocarbon fuel and that is in fluid communication with the fuel injector, wherein the reducing gas stream produced in the first catalytic zone includes $H_2$ and CO.

In one embodiment, the fuel injector is adapted to introduce a fuel to an oxygen containing gas stream discontinuously to for alternating rich and lean zones in the gas stream upstream of the first catalytic zone. In another embodiment, the fuel injector is adapted to introduce the fuel to a portion of an oxygen containing gas stream essentially continuously to form a rich zone, and the device is configured such that the portion of the first catalytic zone through which the rich zone flows varies over time.

In some embodiments, the lean burn engine is a diesel engine. In one embodiment, the fuel is a hydrocarbon fuel, such as diesel fuel. In embodiments in which the added fuel is a hydrocarbon fuel, the products of the catalytic reforming reaction are $H_2$ and CO, which are used as reducing agents to reduce $NO_X$ to $N_2$ in the second catalytic zone. In some embodiments, the second catalytic zone includes a lean $NO_X$ catalyst. In some embodiments, the device is configured such that a portion of the exhaust stream is diverted as a slipstream upstream from the first catalytic zone and the fuel injector is configured to inject fuel into the slipstream upstream from the first catalytic zone. Often, such a device with a slipstream is configured to divert about 5 to about 25% of the exhaust stream by volume into the slipstream.

In one embodiment, the device further comprises a pre-oxidation catalyst upstream of the first catalytic zone, the fuel is injected upstream of the pre-oxidation catalyst, and a portion of the added fuel is oxidized on the pre-oxidation catalyst, thereby heating the gas stream, as described above.

In some embodiments, the device includes a controller which controls the injection of fuel as a function selected from exhaust $NO_X$ concentration, exhaust $O_2$ concentration, engine rpm, engine torque, engine turbocharger boost, engine intake air flow rate, exhaust intake flow rate, exhaust flow rate, and exhaust temperature, or a combination thereof. In one embodiment, the injection of fuel is controlled as a function of exhaust $NO_X$ concentration, which is determined by at least one $NO_X$ sensor in the exhaust stream. In some embodiments, the device is downstream from a lean burn engine that includes an engine control unit, and the controller is incorporated into the engine control unit.

In another aspect, the invention includes a process for producing a reducing gas which includes introducing a fuel into at least a portion of an oxygen containing gas stream to create rich and lean zones in the gas stream, wherein a portion of the fuel in a rich zone is oxidized and wherein at least a portion of the remaining fuel in the rich zone is reformed, thereby producing a reducing gas. In one embodiment, the rich and lean zones flow through a catalytic zone that includes an oxidation catalyst and a reforming catalyst. A portion of the fuel in a rich zone of the gas stream is oxidized on the oxidation catalyst and at least a portion of the remaining fuel in the rich zone is reformed on the reforming catalyst to produce a reducing gas stream. When a hydrocarbon fuel is used, the reducing gas stream includes $H_2$ and CO.

In another aspect, the invention includes a process for reducing $NO_X$ content in oxygen containing emissions of a lean burn engine, e.g., a diesel engine, which includes introducing a fuel, e.g., diesel fuel, into at least a portion of the oxygen containing exhaust stream from the lean burn engine to create rich and lean zones in the exhaust stream, wherein a portion of the fuel in a rich zone is oxidized and wherein at least a portion of the remaining fuel in the rich zone is reformed, thereby producing a reducing gas. At least a portion of the reducing gas is used to reduce $NO_X$ to $N_2$ on a catalyst. In one embodiment, the rich and lean zones in the exhaust stream flow through a first catalytic zone downstream from the fuel injector and having an oxidation catalyst and a reforming catalyst, wherein a portion of the fuel in a rich zone of the exhaust stream is oxidized on the oxidation catalyst and at least a portion of the remaining fuel in the rich zone is reformed on the reforming catalyst, thereby producing a reducing gas. At least a portion of the reducing gas is introduced into at least a portion of the exhaust stream flowing through a second catalytic zone downstream from the first catalytic zone, wherein the second catalytic zone includes a catalyst capable of reducing $NO_X$ to $N_2$ in the presence of the reducing gas, and wherein $NO_X$ is reduced to $N_2$ in the second catalytic zone. In one embodiment, the fuel is a hydrocarbon fuel, such as a diesel fuel, and the reducing gas includes $H_2$ and CO.

In one embodiment, the portion of the first catalytic zone flowing through the first catalytic zone is diverted as a slipstream upstream from the first catalytic zone, and the fuel is injected into the slipstream.

In one embodiment, the fuel is injected upstream of a pre-oxidation catalyst, which is upstream from the first catalytic zone, and a portion of the injected fuel is oxidized on the pre-oxidation catalyst, thereby heating the gas stream, as described above.

In another aspect, a device as described above is adapted for use in a vehicle having a lean burn engine. In one embodiment, the lean burn engine is a diesel engine. A vehicle may include a device of the invention in contact with at least a portion of the exhaust stream from a lean burn engine on a vehicle, such as a diesel engine. In one embodiment, the fuel injected by the fuel injector is diesel fuel on board a vehicle with a diesel engine.

In one aspect, the invention provides a vehicle that contains a device for $H_2$ production and/or $NO_X$ emission as described above. For example, a device as described above may be situated in the exhaust stream of a vehicle, such as an automobile, truck, commercial vehicle, airplane, etc., with at least a portion of the exhaust stream flowing through the device, which is situated downstream from the engine of the vehicle. Methods for reducing $NO_X$ emission as described above may be provided by placing a device of the invention as described above in the exhaust stream of a vehicle, downstream from the engine of the vehicle. The engine of the vehicle may be a SI or CI lean burn engine. In one embodiment, the engine is a lean burn diesel engine.

In another aspect, a device or process of the invention may be used in conjunction with an engine used for stationary power generation or to drive a mechanical device.

In a still further aspect, the invention provides a catalyst composition for producing $H_2$ and CO which includes an oxidation catalyst and a reforming catalyst. In one embodiment, the oxidation and reforming catalysts include the same catalytically active component(s). In another embodiment, the oxidation and reforming catalysts include different catalytically active component(s).

In another aspect, the invention provides a monolithic structure on which an oxidation and reforming catalyst composition or compositions have been coated, either in different or the same areas of the substrate.

BRIEF DESCRIPTION OF THE DRAWINGS

FIG. 3a depicts fuel flow over time when fuel is added to an exhaust stream in a pulsed manner. FIG. 3b depicts concentration of $O_2$ over time as added fuel is catalytically combusted. FIG. 3c depicts the temperatures of the inlet and outlet of the catalytic zone of the fuel processor over time. FIG. 3d depicts concentration of $H_2$ and CO over time as added fuel is catalytically reformed. FIG. 3e depicts concentrations of $O_2$, $H_2$, and CO after mixing.

In FIG. 5A, the catalytic zone 64 comprises a plurality of channels, and fuel is added continuously, mixed with the flowing exhaust, and then added to a portion of the rotating catalyst structure. In FIG. 5B, fuel is injected into through fuel injector 71 and into a flow guide 70. In FIG. 5C, a portion of the exhaust stream 83 bypasses the rotating catalyst 85.

FIG. 6A shows $O_2$ consumption and $H_2$ production at different frequencies of fuel injection. FIG. 6B shows the inlet and outlet temperatures of the catalyst structure over time.

FIG. 7A shows the concentration of $H_2$ produced as a result of added pulses of fuel in the presence of 7% $O_2$, prior to mixing. FIG. 7B shows $H_2$ concentration after mixing.

DETAILED DESCRIPTION OF THE INVENTION

Figure 1:
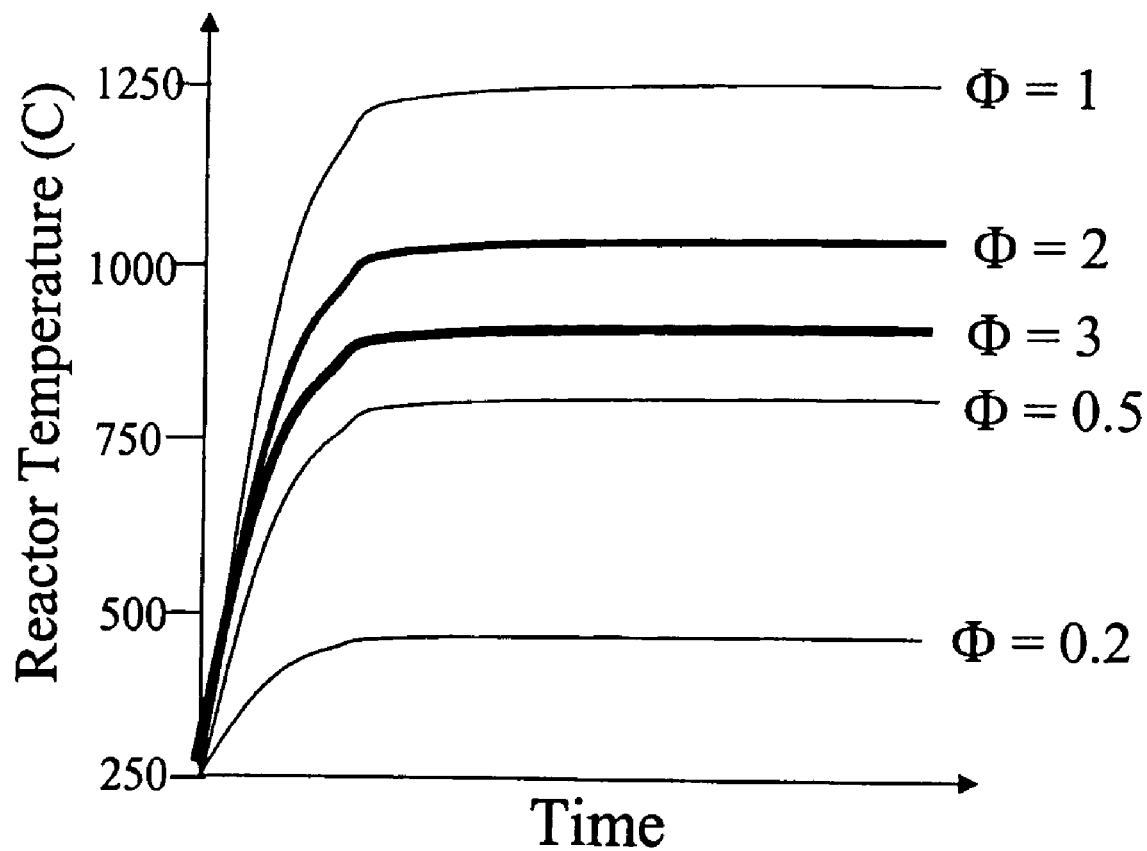
FIG. 1 schematically depicts the steady state temperature of a fuel processing reactor at different equivalence ratios ($\Phi$).

The invention provides methods and devices for improving emission control in lean-burn engines. In particular the invention provides for production of $H_2$ and CO at high efficiency from a hydrocarbon fuel source, and use of these reducing agents for catalytic reduction of $NO_X$ to $N_2$ in the presence of excess $O_2$. This process is applicable to any engine that produces an exhaust stream containing excess $O_2$. In one embodiment of the invention, the fuel on board a vehicle is used to produce $H_2$ and CO, which then serve as reducing agents to convert the $NO_X$ in the vehicle's exhaust stream to $N_2$. The invention also provides methods and devices for production of a reducing gas stream from a fuel in an oxygen containing environment.

Production of $H_2$ from Hydrocarbon Fuel

The invention provides a fuel processing device and methods for producing a reducing gas containing $H_2$ and/or $H_2$ and CO in an $O_2$ containing environment. The reducing mixture produced from a fuel processing device of the invention may be used in a process for control of $NO_X$ emission as described below, or for other applications such as stabilization of the combustion flame in a burner or selective removal of other pollutants.

Devices of the invention employ a fuel processor to produce a reducing gas mixture in an $O_2$ containing gas stream. In some embodiments, the $O_2$ containing gas stream is the exhaust stream from a diesel engine, which generally contains $O_2$, $CO_2$, $H_2O$, and $NO_X$.

The fuel processor includes a catalytic zone that contains oxidation and reforming catalysts. The catalysts are in contact with at least a portion of the gas stream.

The fuel processor also includes a fuel injector for addition of a fuel to the oxygen containing gas stream. The fuel injector introduces a fuel to the gas stream in a manner such that rich and lean zones are formed in the gas stream flowing through the catalytic zone. In some embodiments, the added fuel is a hydrocarbon fuel.

"Equivalence ratio" as used herein refers to the ratio between actual amount of fuel and the theoretical stoichiometric amount of fuel which would be required to fully react with all of the $O_2$ present in a gas mixture. As used herein, "lean" refers to a fuel air equivalence ratio less than 1.0 and "rich" refers to a fuel air equivalence ratio greater than 1.0. A rich zone is produced in the flowing gas stream when fuel is added such that the equivalence ratio in the portion of the gas stream to which the fuel has been added has an equivalence ratio greater than 1. A lean zone is produced either when no fuel is added or when fuel is added in an amount such that the equivalence ratio in the portion of the gas stream to which the fuel has been added is less than 1.

In some embodiments, production of alternating lean and rich conditions in an $O_2$ containing gas stream is accomplished by adding a fuel, such as a hydrocarbon fuel, in a pulsed, discontinuous manner to form alternating rich and lean zones in the gas stream. In other embodiments, fuel is added essentially continuously to form a rich mixture in a portion of the flowing gas stream as the portion of the catalytic zone through which the rich mixture flows is continuously or periodically varied over time.

Under rich conditions, a portion of the added fuel is combusted with oxygen in the gas stream on the oxidation catalyst to release heat, and at least a portion of the remaining added fuel reacts with $H_2O$ produced in the combustion reaction and/or present in the gas stream on the reforming catalyst to produce $H_2$, an endothermic reaction. The combustion reaction provides heat to raise the temperature of the reforming catalyst to an appropriate level to efficiently reform the added fuel. When a hydrocarbon fuel is used, the products of the reforming reaction are $H_2$ and CO, which may both serve as reducing agents in a downstream process such as reduction of $NO_X$ on a lean $NO_X$ catalyst. When ammonia is used as the added fuel, the products of the reforming reaction are hydrogen and nitrogen or nitrogen oxides.

Under lean conditions, in embodiments in which lean zones contain no added fuel, no combustion or reforming reactions due to added fuel take place in the catalytic zone of the fuel processor.

In other embodiments, some fuel is added at an equivalence ratio less than 1 to create lean zones in the oxygen containing gas stream, to generate additional heat. A desirable amount of fuel in the lean zones in such embodiments is determined by the required temperature of the fuel processor catalysts. Additional heat may be required in surplus of the heat generated by combustion of oxygen in the rich zones in order to maintain the catalytic zone at the required operating temperature, for example if the rich zones are very small in magnitude or short in duration, or if the oxygen level in the gas stream is low. In such embodiments in which some fuel is added to form lean zones in the oxygen-containing gas stream at an equivalence ratio less than 1, essentially all of the fuel in the lean zone is combusted with the oxygen in the gas stream on the oxidation catalyst to produce additional heat. Preferably, the amount of additional heat produced in such an embodiment is generally an amount sufficient to maintain the temperature of the catalytic zone within the desired operating temperature range.

The products of the reforming reaction in rich zones of the gas stream, for example $H_2$ and CO when a hydrocarbon fuel is used, exit the catalytic zone with the other components of the gas stream, and may optionally be used in a downstream process to reduce $NO_X$ to $N_2$ on a lean $NO_X$ catalyst for emission control.

In some embodiments, the reducing gas produced by the fuel processor may be fractionated to produce a substantially pure $H_2$ stream. Separation techniques such as, for example, distillation, pressure swing absorption, or use of a selective membrane (e.g., a microporous membrane through which $H_2$ diffuses) may be used to separate $H_2$ front other components of the reducing gas mixture produced by the reforming catalyst.

General Description of the Fuel Processor

As described above, the invention provides a fuel processor for producing $H_2$ from added fuel in an $O_2$ containing gas stream. The exhaust from a lean burn engine, such as a diesel engine, typically contains 8-15% $O_2$ and 6-10% $H_2O$. A fuel processor of the invention may be used to produce reducing agents, e.g. $H_2$ and CO from added hydrocarbon fuel, in such an exhaust stream, which may be used as reducing agents in a downstream process such as reduction of $NO_X$ emission.

To avoid the disadvantages of continuous fuel addition discussed above, the fuel processing device of the present invention includes a fuel injector for adding a fuel such that the gas stream flowing over the catalyst alternates between rich and lean conditions. When used in the manner described herein, this results in a lower temperature for the fuel processor catalyst and a lower temperature for the gas mixture exiting the fuel processor catalyst than if the fuel were added continuously.

Figure 2:
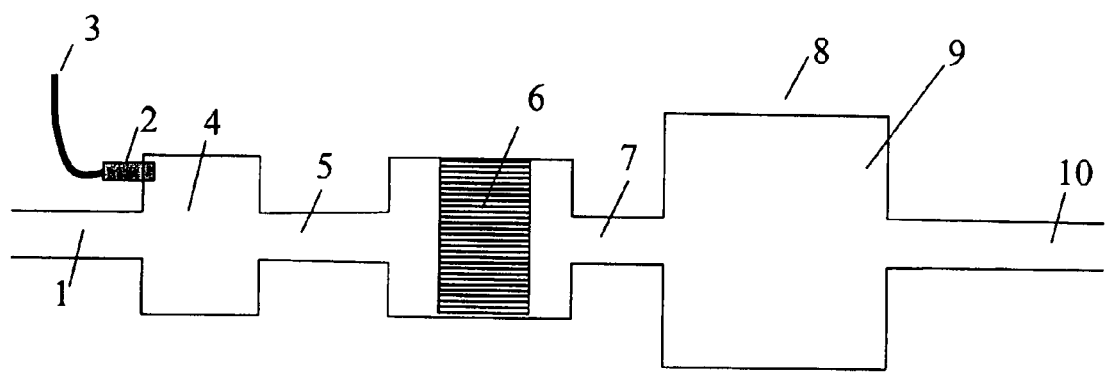
FIG. 2 depicts one embodiment of a fuel processor in accordance with the invention, containing an exhaust inlet 1 and outlet 10, a fuel injector 3, a catalytic zone 6 for oxidation and reforming of injected fuel, and mixing zones 4 and 9. The mixing volumes 4 and 9 may be the same or different sizes and may optionally include internal components to aid or improve mixing.

One illustrative embodiment of a fuel processor device of the invention is depicted in FIG. 2. FIG. 2 shows a pipe or duct 1 that is connected to a fuel injector 2 and a mixing system 4. A gas stream flows into the system through pipe 1, and is mixed with fuel injected through the fuel injector 2 fed by fuel supply 3. Fuel is injected into the gas stream upstream of the inlet of the catalytic zone 6. In one embodiment, depicted in FIG. 3, a hydrocarbon fuel is injected into mixer 4 in a discontinuous, pulsed manner to form rich zones when the fuel injector is injecting fuel into the gas stream and lean zones when the fuel injector is not injecting any fuel into the gas stream.

As fuel, for example hydrocarbon fuel, is added in this manner, as depicted in FIG. 3a, rich and lean zones are created in the gas stream, such that the equivalence ratio in a rich zone is greater than 1 and the equivalence ratio in a lean zone is less than 1. The resulting rich and lean gas mixtures flow through a catalytic zone 6, as shown in FIG. 2, which contains oxidation and reforming catalysts, where the hydrocarbon fuel in a rich zone of the gas stream is combusted with $O_2$ in the gas stream on the oxidation catalyst, and then converted to $H_2$ and CO on the reforming catalyst after essentially all of the $O_2$ has been consumed.

During the period when the fuel is injected to form a rich zone, the fuel flow is set at a flow rate such that the equivalence ratio in the portion of the gas stream into which fuel is injected is above 1, typically at least about 1.5, often at least about 2. Since the equivalence ratio in the rich zone is above 1, essentially all of the $O_2$ is consumed, as shown in FIG. 3b, and the $O_2$ level exiting the catalytic zone is essentially zero, i.e., close to or equal to zero. The combustion of the large amount of oxygen in the gas stream raises the catalyst and gas temperature to the level needed to cause the reforming of the remaining fuel as shown in FIG. 3c. Since the fuel-exhaust mixture is "rich," i.e., equivalence ratio greater than 1 when the fuel is being injected, and since the temperature is high due to the combustion of a portion of the fuel, $H_2$ and CO are formed from the excess fuel, as shown in FIG. 3d. A fuel pulse is sufficiently long that the resulting heat that is generated by full combustion of $O_2$ heats the oxidation and reforming catalysts 6 in FIG. 2 to the desired temperature for reforming, generally about 450 to about 1000° C., sometimes about 500 to about 900° C., often about 550 to about 650° C., most often about 600° C. Before the catalyst temperature can rise to the steady state temperature, which would be too high for good durability of the catalyst, the fuel is shut off (region 12 in FIG. 3a).

As low temperature gas in a lean zone of the gas stream flows through the catalytic zone, the catalyst temperature decreases. Subsequent fuel pulses can be added, as shown in FIG. 3a, with the fuel flow during the period of fuel injection controlled to reach the desired equivalence ratio. As the fuel is pulsed in this manner, pulses of $H_2$ and CO are generated, as shown in FIG. 3d, in the exhaust stream exiting the outlet of the catalytic zone, while the catalyst temperature is maintained at a relatively constant level, as shown in FIG. 3c.

Exhaust stream 7 is optionally passed through a mixer, e.g., 8 in FIG. 2, to generate a relatively steady state concentration of $H_2$ and CO, as represented in FIG. 3e. Mixers may optionally be provided upstream of the catalytic zone, to provide a uniform fuel-exhaust mixture, and/or downstream of the catalytic zone, to provide a uniform concentration of reducing agent in the exhaust stream. Such mixers, represented by reference numerals 4 and 8 in FIG. 2, can be the same or different sizes, can be configured in a variety of shapes and can include internal structures or devices to promote mixing, such as veins, tabs, or other physical devices that do not induce a large axial recirculation zone. Appropriate internal mixers may be readily determined by one of skill in the art. If pulsing or discontinuous reductant, e.g., $H_2$ and CO, concentration is desired, mixer 8 of FIG. 2 may be eliminated.

Figure 3:
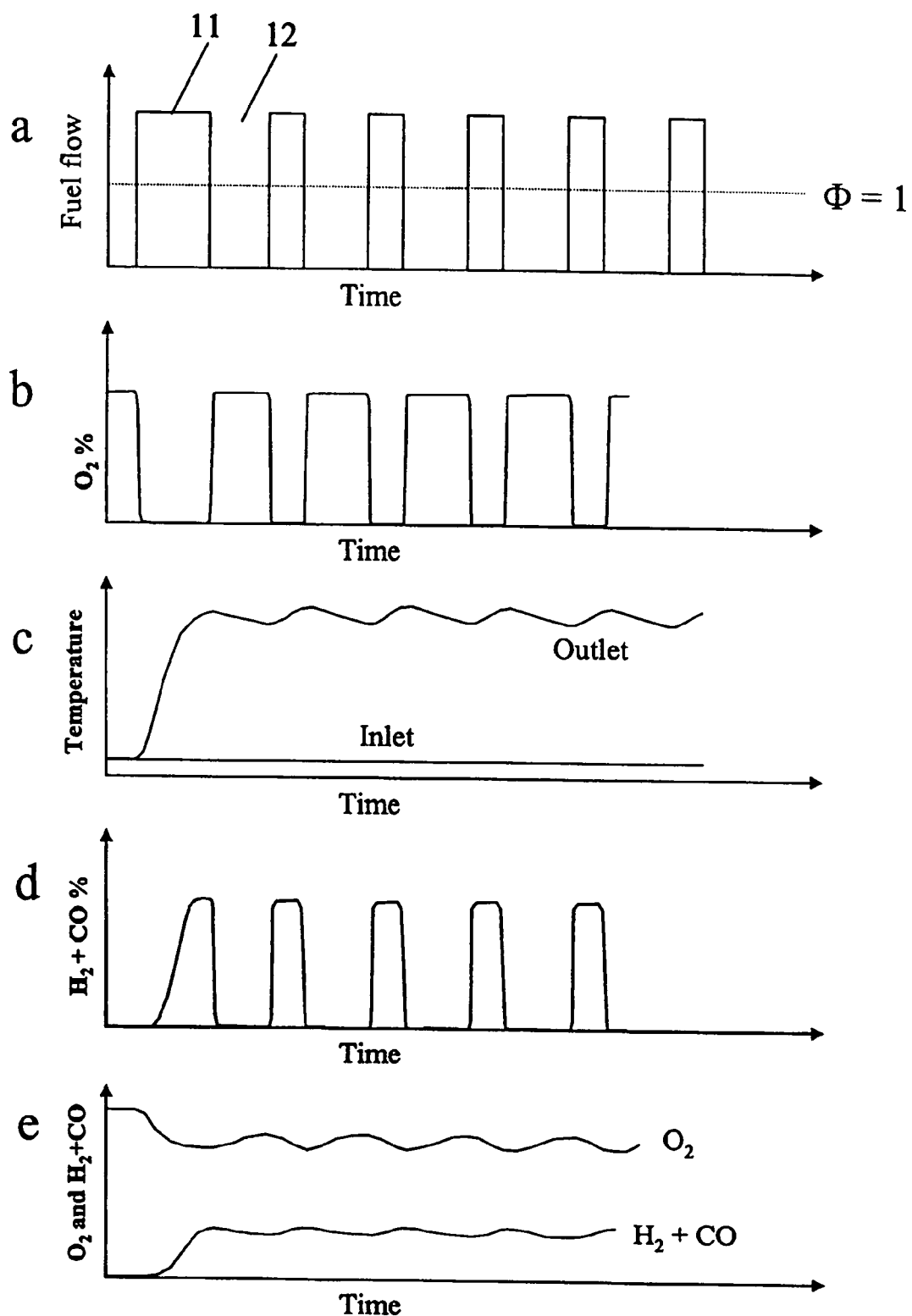
FIG. 3 schematically depicts various parameters relating to a fuel processor of the invention wherein fuel is added in a pulsed manner.

In one embodiment, a first pulse of fuel is longer than subsequent pulses, to rapidly heat the catalysts to the desired temperature, as depicted in FIG. 3a. Subsequent pulses can be of a selected flow rate, duration and frequency to maintain a relatively constant catalyst temperature. In another embodiment, the fuel pulsing is initially set at a desired steady state frequency with all pulses of essentially equal duration, with the result that the catalyst temperature will gradually reach the steady state temperature and the $H_2$ and CO output will gradually approach the desired value. In the embodiment shown in FIG. 3, the fuel flow during the lean portion 12 of a cycle is essentially zero. In other embodiments, some fuel is injected during the lean part of the cycle at an equivalence ratio less than 1, so that additional heat can be generated during this portion of the cycle as the added fuel is consumed in a combustion reaction on the oxidation catalyst.

The fuel processor of the invention is not limited by the illustrative embodiments described above. Alternate designs for the fuel processor may be used in accordance with the present invention so long as they are capable of adding fuel to an oxygen-containing gas stream to form rich and lean zones in the gas stream for efficient reforming of the fuel as discussed above.

In some embodiments, rather than adding the fuel in a pulsed manner, fuel is added essentially continuously with rich and lean zones formed in the gas stream by radially rotating the catalyst structure relative to the direction of flow of the gas stream, or by continuously or periodically changing the position or spray angle of the fuel injector such that only a portion of the catalytic zone is in contact with a rich mixture at any given time and the portion in contact with the rich mixture varies over time.

Figure 5:
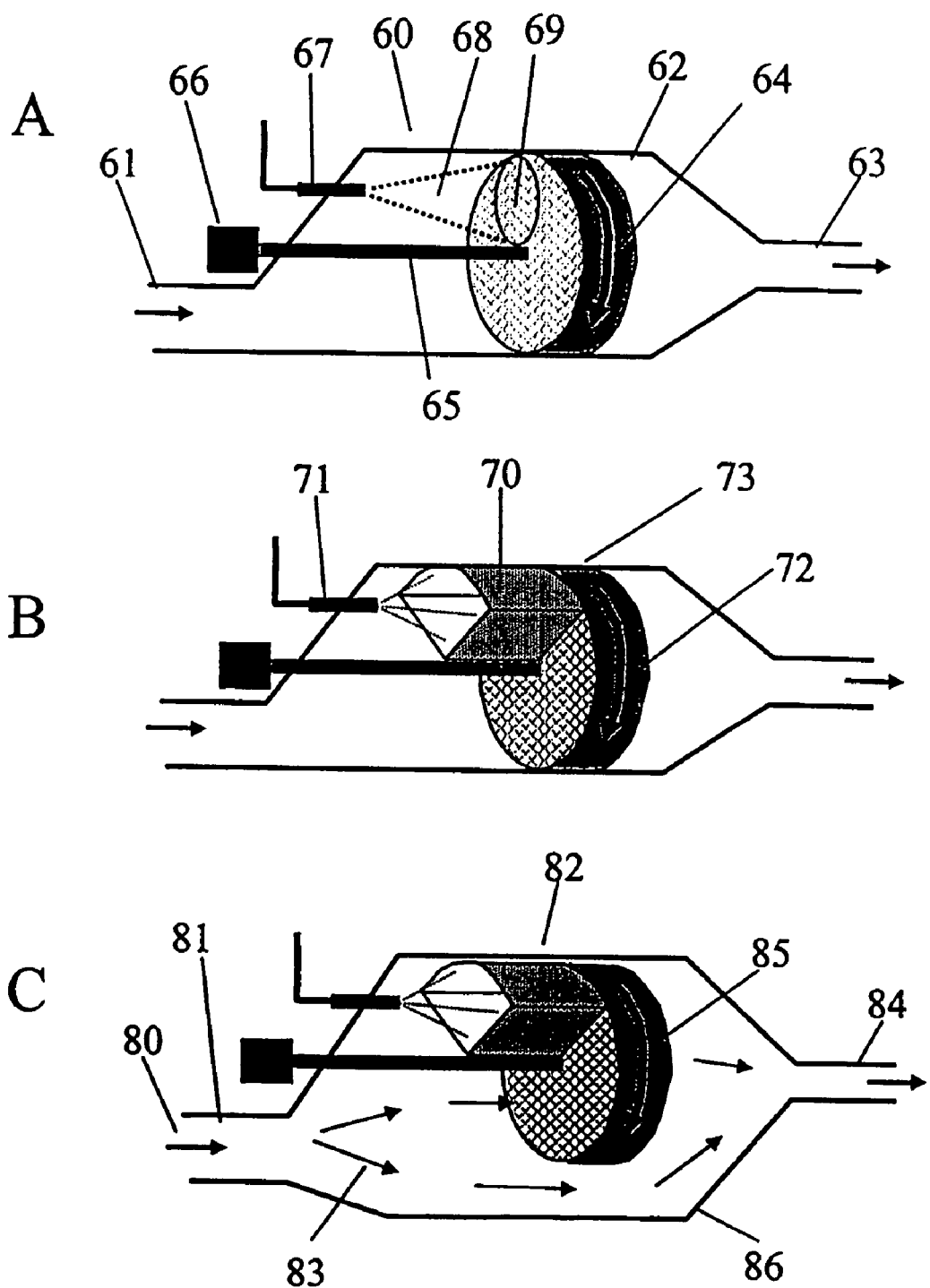
FIG. 5 depicts one embodiment of the fuel processor of the invention.

In one embodiment of the fuel processor, depicted in FIG. 5A, fuel is added continuously to a portion of the gas stream entering a rotating catalyst structure having a plurality of longitudinal channels, configured such that the gas stream flows through the channels from the inlet to the outlet of the catalyst structure. The walls of the channels are coated with oxidation and reforming catalysts. The radial rotation of the catalyst structure within the gas stream, while fuel is continuously added to a portion of the gas stream entering the catalyst structure, effectively produces the same effect as adding fuel in pulses to produce alternating rich and lean zones flowing through the entire catalytic zone. By using an appropriate geometry, periodic lean and rich conditions are created in continuously or periodically varying portions of the catalyst structure. The exhaust gas enters fuel processor 60 through exhaust duct 61, passes through main chamber 62 and out exhaust duct 63. Within the main chamber 62 is a monolithic catalyst substrate 64 with longitudinal channels, for example in a honeycomb configuration as shown in FIG. 5A, that is caused to rotate by a shaft 65 driven by drive unit 66. Fuel is injected through fuel injector 67, creating a spray pattern 68 and thus a rich zone that encounters the monolithic structure in the region shown by outline 69. The continuous fuel injection rate is set so that the equivalence ratio in region 69 is above 1, typically in the range of between about 2 to about 5. Region 69 of the catalytic zone is varied over time as the catalyst structure rotates.

In another embodiment, the fuel is continuously injected into a flow guide 70 as depicted in FIG. 5B. Fuel injector 71 injects the fuel into the inlet of the flow guide and the flow guide allows mixing of the fuel and exhaust gas to produce a relatively uniform fuel concentration as this fuel exhaust mixture enters catalyst 72.

The fuel processor embodiments depicted in FIG. 5a and FIG. 5b do not require a tight gas seal between the catalytic zone (64, 72) and the main chamber (62, 73). This greatly simplifies the design of the rotating catalyst (64, 72). Rotating the catalyst structure adds complexity, additional components, and added cost to the system but this approach has the advantage of producing an essentially continuous stream of exhaust containing reducing agents, for example $H_2$ and CO when a hydrocarbon fuel is added to the gas stream, that is more readily mixed with the remaining exhaust or gas flow.

In an alternative implementation, rather than rotating the catalyst structure, the spray angle of fuel injector 67 is changed. By changing the spray angle, the region of rich fuel/air ratio may be moved around on the catalyst structure, effectively duplicating the operation of a rotating catalyst as in FIG. 5A. The injector spray angle may be changed mechanically by physically moving the injector, by using an additional air flow that interacts with the fuel spray from the injector to change the effective spray angle, or by using electrically driven components within the injector to change the spray angle.

The fuel processor 60 shown in FIG. 5A or FIG. 5B can be configured in an emission control system where a portion of the exhaust stream is diverted as a slipstream to the fuel processor and then reintroduced into the main exhaust stream after generating products of the reforming reaction, such as $H_2$ and CO. An alternative approach is to allow most of the exhaust stream to bypass the catalyst structure as shown in FIG. 5C. The entire exhaust flow 80 enters the fuel processor through duct 81. A large portion of the exhaust bypasses the fuel processor catalyst as shown by flow path 83 and exits fuel processor unit 82 through duct 84. A portion of the exhaust flow is diverted to the fuel processor catalyst 85, dependent upon the flow resistance for each path. The fuel injection and fuel processor rotating catalyst structure or varying fuel spray angle operate essentially as described for the fuel processor systems depicted in FIG. 5A and FIG. 5B. In some embodiments, the fuel processor unit 82 includes baffles and partitions inside the main chamber 86 to direct the desired amount of flow through the fuel processing catalyst. Appropriate design and configuration of such partitions and baffles may be readily determined by those skilled in the art.

In embodiments such as those represented in FIGS. 5A, 5B, and 5C, the catalyst structure is preferably be of sufficient thermal mass to maintain the catalysts at the desired operating temperature, generally about 450 to about 1000° C., sometimes about 500 to about 900° C., often about 550 to about 800° C., often about 600° C.

A number of hydrocarbon fuels are suitable for addition to the oxygen-containing gas stream in any of the fuel processor embodiments of the invention, including diesel fuel, gasoline, methane, kerosene, other hydrocarbons, alcohols, or any hydrocarbon containing fuel. Gaseous, liquid, oxygenated, nitrogen containing, and sulfur containing hydrocarbons may also be used. In addition, a non-carbon containing fuel such as ammonia, hydrogen sulfide, or other combustible material, may be used if combustion at an equivalence ratio greater than 1 produces a hydrogen containing stream in a device of the invention. The fuel used must be capable of releasing an appropriate amount of heat upon combustion to raise the temperature of the reforming catalyst to a level suitable for efficient production of reducing agents, e.g., $H_2$ or $H_2$ and CO. In a particularly advantageous embodiment, using this approach, a hydrocarbon fuel on board a vehicle with a lean burn engine can be processed with the engine exhaust to produce an exhaust stream containing $H_2$ and CO.

$NO_X$ Emission Control

The invention provides an emission control device and method for reducing the $NO_X$ content in oxygen-containing emissions from a combustion process, particularly combustion of a hydrocarbon fuel that occurs in a lean burn internal combustion engine. Devices of the invention are particularly useful for reducing $NO_X$ emissions in the exhaust of a vehicle diesel engine. As used herein, "$NO_X$" refers to nitrogen oxides produced in a combustion process, particularly nitrogen oxides present in the exhaust stream of an internal combustion engine, such as NO and $NO_2$. A "lean burn" or "lean burning" engine refers to an engine that combusts hydrocarbon fuel at an air to fuel ratio in which there is more air than the stoichiometric amount of air needed to oxidize the fuel. This requires an air to fuel mass ratio above 15 and typically above 25 for a diesel engine. Emissions from a lean burn diesel engine typically contain about 8-15% $O_2$ and 400-700 ppm $NO_X$ in the exhaust gas.

The emission control device also includes a second catalytic zone in contact with the exhaust stream and downstream from the catalytic zone of a fuel processor as described above. The second catalytic zone includes a catalyst composition that includes a catalyst, such as a "lean $NO_X$ catalyst," which is capable of selective catalytic reduction of $NO_X$ to $N_2$ in an $O_2$ containing environment, particularly the exhaust of a lean burn engine, using the $H_2$ and CO produced by the fuel processor. When the reducing agent(s) produced by the fuel processor, e.g. $H_2$ and CO, reach the second catalytic zone, $NO_X$ is reduced to $N_2$ on the catalyst therein, thereby providing a reduction in $NO_X$ emission.

The invention provides methods for reducing $NO_X$ produced by a lean burn combustion process, such as combustion in a diesel engine, using an emission control device of the invention. Methods of the invention include injecting a fuel into at least a portion of an $O_2$ and $NO_X$ containing exhaust stream to create rich and lean zones in the exhaust stream. The rich and lean zones flow through the catalytic zone of the fuel processor as described above. The catalytic zone of the fuel processor contains both oxidation and reforming catalysts. In rich zones, a portion of the fuel is oxidized and at least a portion of the remaining fuel is reformed on the reforming catalyst to produce reducing agent(s), for example $H_2$ and CO when a hydrocarbon fuel is used. The reducing agents, e.g., $H_2$ and CO, are introduced into the exhaust stream upstream from a second catalytic zone and react with $NO_X$ on a catalyst in the second catalytic zone to produce $N_2$, thereby reducing $NO_X$ emission.

In an advantageous embodiment, the fuel on board a vehicle with a lean burn engine, for example diesel fuel on board a diesel engine powered vehicle, is processed in a fuel processor of the invention to produce $H_2$ and CO, which reduce $NO_X$ emission levels in conjunction with a lean $NO_X$ catalyst in the second catalytic zone of an emission control device as described herein.

Figure 4:
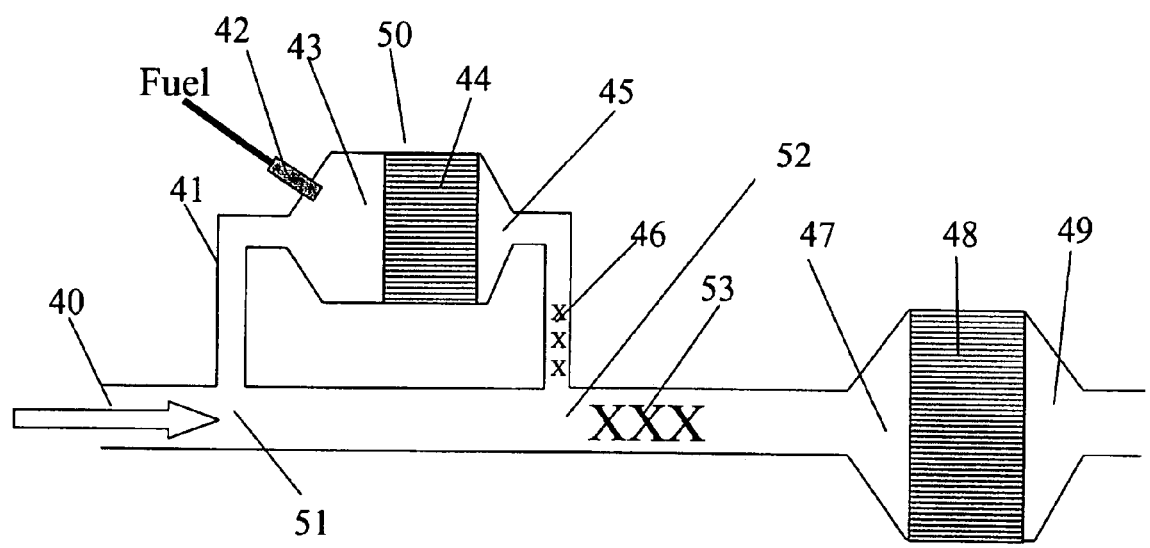
FIG. 4 depicts one embodiment of a $NO_X$ emission control device of the invention. A portion of the exhaust stream 40 is diverted as a slipstream 41. Fuel injected through injector 42 reacts with the exhaust gases in a first catalytic zone 44 to produce $H_2$ and CO, which are then mixed 46 and 53 into the flowthrough exhaust. $H_2$ and CO react with $NO_X$ in a second catalytic zone 48 to produce $N_2$.

In one embodiment, depicted schematically in FIG. 4, a portion of an oxygen-containing engine exhaust stream 40 is diverted as a "slipstream" 41. Fuel is then injected into the gas stream in the slipstream through a fuel injector 42. The fuel is added to the slipstream exhaust in region 43 and the mixture then flows through the catalytic zone 44 to produce products of the reforming reaction, e.g., $H_2$ and CO, which is then mixed with the flowthrough engine exhaust stream in mixers 46 and 53. The reforming products, e.g., $H_2$ and CO, then react with the NOx in the exhaust stream on a lean $NO_X$ catalyst 48 to reduce the $NO_X$ emission level in the exiting exhaust stream 49.

In an embodiment in which a portion of the exhaust stream is diverted in a slipstream, the amount of exhaust that is diverted to the slipstream and through the fuel processor catalytic zone can be varied over a wide range. Typically, about 1 to about 50% of the total exhaust is diverted into the slipstream. Since the gas flow through the fuel processor is heated to the reforming temperature by oxidizing fuel, this represents a heat loss and decreased efficiency. For this reason, it is preferable to limit the amount of the exhaust stream that is diverted to the fuel processor. The reforming products, e.g., $H_2$ and CO, generated by the fuel processor are then added back to the main exhaust flow at 52 resulting in a large dilution. This large dilution means that for a given target concentration in the mixed stream 47, the concentration of reductant produced at 45 must be proportionately higher. For example, for 1000 ppm of $H_2$ and CO at the inlet to the second catalytic zone 47 and with a split of 5% to the fuel processor, the average concentration of $H_2$ and CO at 45 must be 2%. These two requirements drive the split ratio in different directions.

Figure 8:
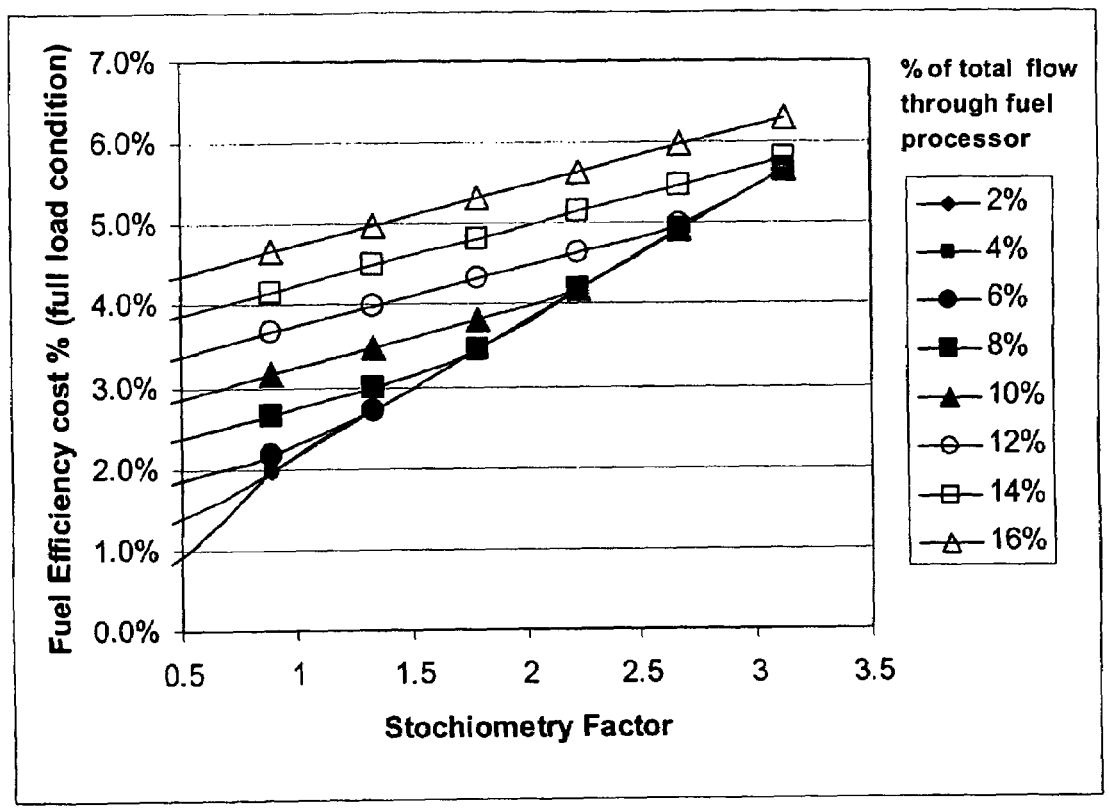
FIG. 8 depicts calculated values of fuel penalty versus stoichiometry factor for several levels of exhaust gas flow diverted to a fuel processor of the invention.

FIG. 8 shows some calculated values of fuel penalty versus stoichiometry factor for several levels of exhaust gas flow diverted to the fuel processor. These calculations were done for a typical diesel engine with a NOx emission level in the range of 5 g/b-hp-hr (grams per brake horsepower hour) and operating at high load. The stoichiometry factor is the ratio of $H_2$ and CO that is required to reduce each molecule of NOx. At a stoichiometry factor of 1, one $H_2$ molecule or one CO molecule will reduce one NOx molecule. As shown, the lowest fuel penalty is obtained with the lowest flow of exhaust diverted to the fuel processor and the lowest stoichiometry factor. The theoretical stoichiometry factor would be 1 for NO and 2 for $NO_2$ and for an efficient lean NOx catalyst the stoichiometry factor would be expected to be in the range of 1 to 3. Preferably, the fraction of exhaust flow diverted to the fuel processor ranges from a volume percentage of about 1% to at least about 50%, more preferably from about 3 to about 30%, even more preferably from about 5 to about 25%, most preferably about 8 to about 15%.

Since the fuel processor catalyst structure 44 in FIG. 4 may provide resistance to flow of the diverted exhaust stream, some embodiments include a means of regulating the "split ratio," or ratio of amount of exhaust diverted into the slipstream to amount of flowthrough exhaust. Examples of means suitable for regulating the split ratio include variable means, such as a valve at location 51 or 52. In some embodiments, the valve includes a door that is fixed or variable, although other means capable of directing a certain amount of exhaust flow to the fuel processor 50 may be used in accordance with the invention. A fixed regulation means may also be used. One example of a fixed means is a flow restrictor, such as an orifice, that is located in the main exhaust duct between locations 51 and 52. Such a restriction would direct a given fraction of the exhaust flow to the fuel processor 50 based on the relative restriction caused by the flow restrictor in the main duct compared to the restriction caused by the components of fuel processor 50. A restrictor placed in the duct between locations 51 and 52 can be either a fixed restrictor with a fixed opening or it can be a variable restrictor such as a valve or a door.

Fuel Injection

A number of fuel injectors suitable for use in the invention are well known in the art. In some embodiments of the invention, pressurized fuel is supplied to the injector and the injector then opens and closes a flow control valve to turn the fuel flow on and off. Such injectors have been extensively developed as automotive fuel injectors and are described, for example, in U.S. Pat. Nos. 6,454,192, 5,979,866, 6,168,098, and 5,950,932. Such injectors utilize a low pressure supply of fuel, in the range of 30 to 600 psig and can turn fuel flow on and off very rapidly, at a speed that is typically in the range of 0.2 to 1 millisecond, using an electrical signal to move a solenoid or valve within the injector. Such fuel injectors control the fuel flow rate by opening and closing the injector very rapidly, with the fraction of time open set to control the fuel flow. For use in devices of the invention, the frequency of this opening and closing can be very fast, so that the fuel flow is essentially continuous. For example, using a frequency of 50 to 100 Hz and controlling the fraction of time open, the fuel flow rate can be controlled to produce the desired equivalence ratio during the rich pulses shown in FIG. 3a. The fuel injector is then fully closed during the lean periods. Thus, such fuel injectors may be operated with two frequency components, a high frequency component that would be used to give the required fuel flow rate during the rich and lean periods shown in FIGS. 3a and 3d. The injector would be essentially off for the lean periods shown in FIG. 3a and FIG. 3d. If some fuel flow is desired during the lean periods to maintain fuel processor catalyst temperature, then high frequency operation of the injector with a very low fraction of open time would result in a very low fuel flow.

Other types of injectors may also be used, such as air assist injectors. Air assist injectors utilize pressurized air, which flows through the injector with the fuel to obtain a desired fuel droplet size, spray pattern, or spray direction, or to utilize fuel at a lower supply pressure. Multiple injectors may also be used. As another alternative, the injection means may include a simple nozzle to disperse and direct the fuel spray, this nozzle being connected to a fuel line which supplies the fuel in pulses from a pulse pump or other means. The injected fuel must be transferred to the fuel processor catalyst in a short time and it would be disadvantageous for it to remain in liquid form on pipe or component walls. One embodiment which provides a solution to this problem includes direct spraying of the fuel onto the catalyst surface, limiting the interaction of the fuel with potentially cold metal surfaces of the fuel processor or the exhaust system. Another embodiment includes spraying of the fuel on a very hot surface to flash vaporize it. A further embodiment includes pre-vaporization of the fuel in a separate hot chamber, followed by release of the vaporized fuel through an injector.

Mixing of Fuel and Exhaust

To achieve the correct catalyst temperature for the generation of reforming products, e.g., $H_2$ and CO, the fuel to oxygen ratio must be within an appropriate range to provide the desired level of heat output to maintain the catalyst temperature and to produce the required level of $H_2$ and CO. This requires mixing of the injected fuel and the exhaust flow upstream of the fuel processor catalyst to achieve an appropriate level of uniformity of the fuel-exhaust mixture prior to entering the catalytic zone. Using variation of equivalence ratio to define the level of uniformity required, an equivalence ratio uniformity of +/−40% is desired, +/−30% is preferred, and a uniformity of +/−20% is most preferred. One method is to use a very uniform injector providing a uniform fuel spray pattern to the inlet face of the catalyst structure. This uniform fuel spray pattern could then be combined with a uniform exhaust gas flow through the fuel processor catalyst, resulting in a relatively uniform fuel concentration at the fuel processor catalytic zone inlet. In some embodiments, the fuel and gas flow mixture entering the fuel processor catalytic zone include partially vaporized and partially liquid fuel. When the fuel is not fully vaporized, contact of the fuel gas mixture with metal surfaces can result in collection of the fuel as a liquid film on these surfaces, which can reduce the effective fuel concentration uniformity. In addition, slow evaporation of the fuel can alter the lean and rich zones and reduce the performance of the system to produce reductant, e.g., $H_2$ and CO. Preferably, the fuel injector and exhaust flow are configured to produce a substantially uniform fuel concentration at the inlet to the catalytic zone of the fuel processor. In some embodiments, at least some portion of the fuel entering the catalytic zone is not vaporized and enters in the form of droplets.

Figure 11:
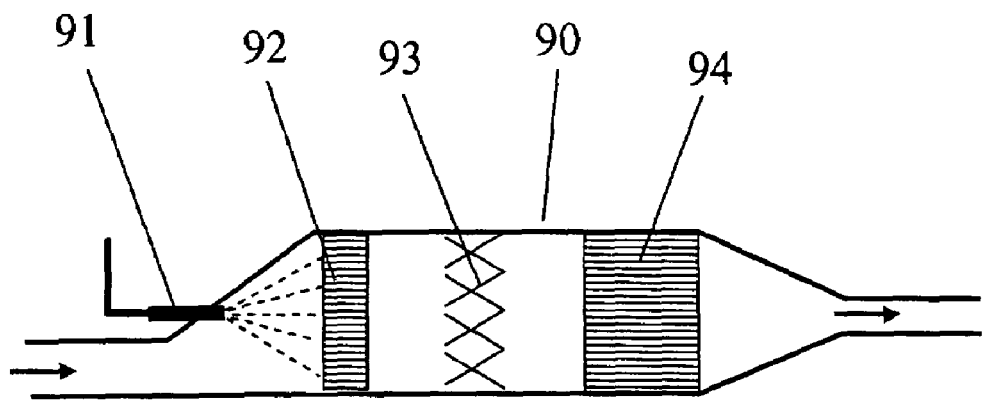
FIG. 11 depicts an embodiment of a $NO_X$ emission control device including a fuel injector 91, a pre-oxidation catalyst 92, a mixer 93, and oxidizing and reforming catalysts 94.

A second method to achieve the desired fuel concentration at the fuel processor catalytic zone inlet is to first partially react the fuel with oxygen on a pre-combustion catalyst thus raising the fuel-exhaust mixture temperature and partially or completely vaporizing the fuel. This vaporized fuel and exhaust mixture is then mixed using standard gas mixing techniques to form the desired equivalence ratio uniformity for the fuel processor catalyst. Such a system is shown schematically in FIG. 11, including a fuel processor system 90 with a fuel injector 91 injecting fuel onto pre-oxidation catalyst 92. The pre-oxidation catalyst combusts a portion of the fuel with oxygen in the gas stream and raises the temperature such that some portion of the fuel is vaporized. This vaporized fuel is then mixed with the exhaust flow by mixer 93 to form a more uniform fuel oxygen mixture for the fuel processor oxidation/reforming catalyst 94 which then produces reductant, e.g., $H_2$ and CO, during the rich cycles. Mixer 93 is designed to mix the fuel and exhaust gas radially and to limit mixing of the fuel and air axially thus maintaining the high equivalence ratio during the rich pulse and thus maximizing reforming of fuel to $H_2$ and CO. Predominantly radial mixing without substantial axial mixing is generally desirable to maintain the magnitude of a rich pulse.

In one embodiment, the pre-oxidation catalyst is a wash-coated monolithic honeycomb substrate with open channels to allow a low pressure drop. The pre-oxidation catalyst substrate can be a ceramic or metal honeycomb structure with the channel walls coated with an oxidation catalyst. The catalyst substrate can be of any length and contain any channel size, but a short length substrate or a large channel size may be desirable in some embodiments since it is desirable to react only a portion of the fuel to raise the mixture temperature sufficiently to vaporize a portion or all of the fuel. The catalyst substrate structure can alternatively include a metal substrate that is formed from corrugated metal strips that are coated with oxidation catalyst on only one side and then formed into a spiral structure as described in U.S. Pat. Nos. 5,250,489 and 5,512,250. Such structures with a catalyst coating on only one side of the wall of adjacent channels can limit the temperature rise of the catalyst substrate. This would be desirable if the fuel-exhaust mixture is not uniform. It is desirable that the amount of fuel vaporized in such a pre-combustor catalyst system be at least about 50%, preferably about 70% and most preferably about 80% vaporized. In some embodiments, it is desirable to vaporize essentially all of the fuel to prevent it from collecting on the walls of the emission control system.

Operation at Low Exhaust Temperature

At low exhaust temperatures the injected fuel may not be sufficiently vaporized. To overcome this limitation, an electric heater can be placed upstream of the fuel processing catalyst to heat the portion of exhaust flow into the fuel processing catalyst. For example in the embodiment depicted in FIG. 4, an electric heater could be placed in duct 41 to heat the exhaust gas flowing into the fuel processor 50, through fuel air mixing space 43 and into fuel processor catalyst 44. This electric heater can be of any suitable type known in the art. For example, it could consist of electrical resistance wire suspended in the exhaust flow, electrically heated metal strips, electrically heated metal walls of the flow path of the exhaust stream or any method of heating the exhaust gas to the desired temperature.

An alternative method is to electrically heat a portion of the fuel processor catalyst by employing a catalyst substrate made of metal and passing a current through the metal substrate. The electrical power could be limited by using a large channel size so that only a portion of the exhaust gas flow is heated directly by the heated metal substrate. A further alternative is to use heat exchange between the hot gas exiting the fuel processor catalytic zone (45 in FIG. 4) and the gas entering the fuel processor system (41 in FIG. 4). This heat exchange can be performed by a number of methods that are well known in the art, including, for example, tube and shell heat exchangers, fin and tube heat exchangers, or pipe devices.

Oxidation and Reforming Catalysts

In various embodiments, the oxidation and reforming catalysts are in the form of pellets or beads in a container, or coated on the walls of a monolithic structure. As used herein "monolith" or "monolithic structure" refers to a unitary structure with one or a plurality of channels. In some applications, a monolithic structure, for example a honeycomb configuration, is advantageous, because vibration, for example in a vehicle, could cause abrasion and loss of pelleted or beaded material. Further, monolithic structures typically have lower pressure drop or back pressure with respect to the flowing exhaust stream. A monolith is typically composed of ceramic or metal material, with the ceramic or metal constructed in such a way as to form open channels from the inlet face, through the structure, to the outlet face and may have a variety of channel or cell sizes and shapes.

The catalyst material is typically formed into a sol or colloidal dispersion in a liquid carrier and then applied to internal surfaces of the monolithic metal or ceramic substrate to form a layer of catalyst coating on these internal surfaces. A review of monolithic catalytic substrates is provided in Heck and Farrauto, "Catalytic Air Pollution Control-Commercial Technology," Van Nostrand Reinhold, 1995, pages 19-26. A "support" or "substrate" is a material containing a catalyst composition, which is often coated thereon. An example of a support is a high surface area porous material, such as a refractory oxide on which a catalytic material is deposited. A "refractory oxide" refers to a material that may serve as a base for incorporation of catalytic reactive species, having preferred desirable properties such as high surface area, thermal stability at high temperature, or chemical resistance to the reaction stream.

The cell size and shape of a monolithic structure is selected to obtain the desired surface area, pressure drop, and heat and mass transfer coefficient required for a particular application. Such parameters are readily ascertainable to one of skill in the art. In accordance with the present invention, the channel can be any shape suitable for ease of production and coating, and appropriate flow of the gas stream. For example, for metal substrates, channels may be corrugated into straight, sinusoidal, or triangular shapes, and/or may include a herringbone or zig-zag pattern. For a ceramic substrate, the channels may be, for example, square, triangular, or hexagonal, or any shape that can be formed by extrusion or other methods of manufacture known in the art. Channel diameters are typically in the range of about 0.001 to about 0.2 inches, preferably from about 0.004 to about 0.1 inches.

Figure 9:
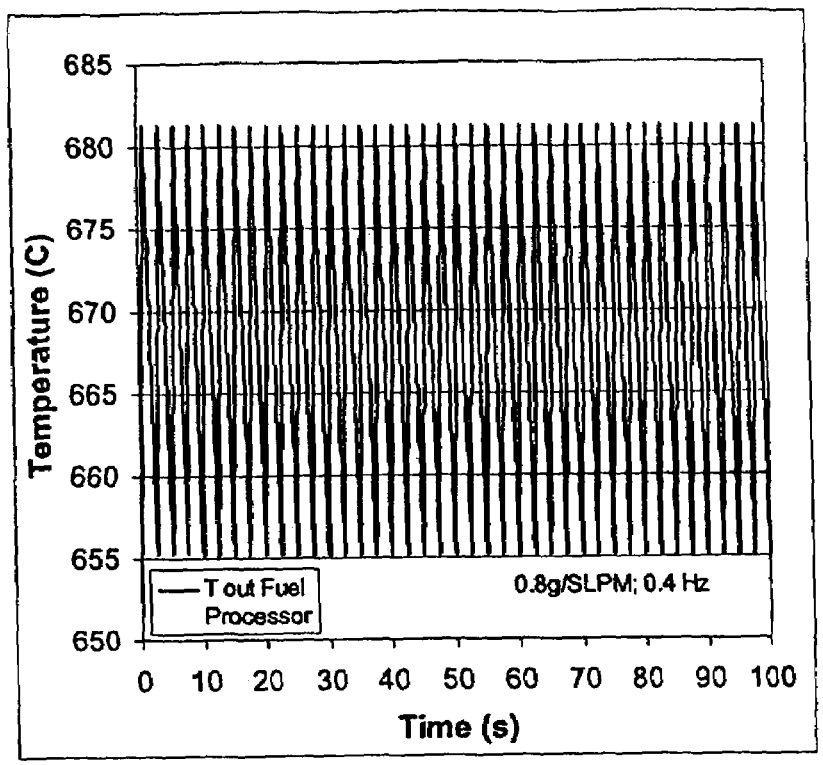
FIG. 9 depicts temperature versus time as fuel is pulsed through the catalyst of a fuel processor of the invention, for a catalyst mass to gas flow ratio of 1250 liters per minute, catalyst mass 1000 g, pulse frequency 0.4 Hz, equivalence ratio of approximately 3, and 10% $O_2$.
Figure 10:
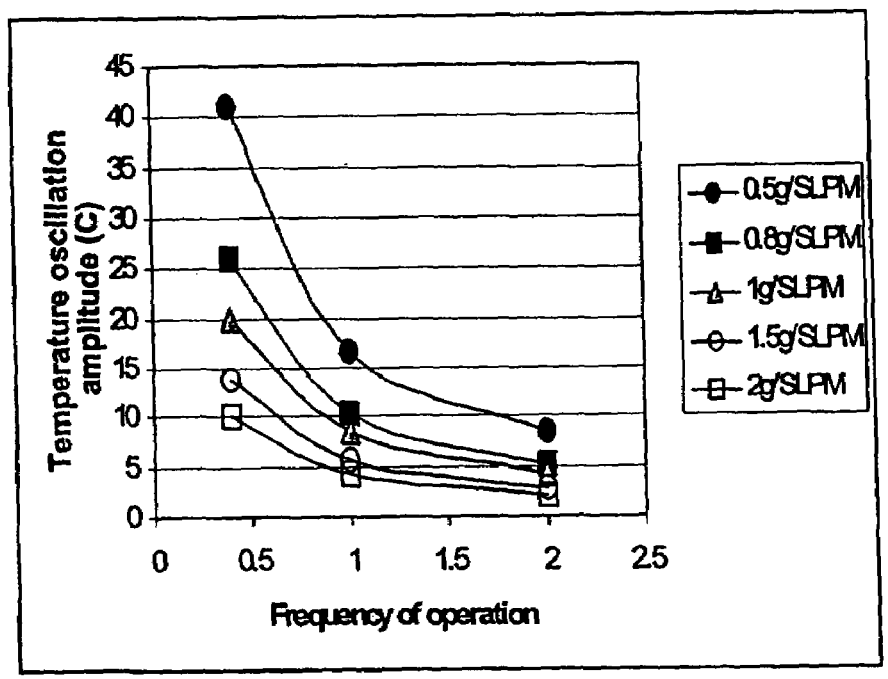
FIG. 10 depicts temperature oscillation amplitude vs. frequency of operation for several different catalyst mass to gas flow ratios.

In some embodiments, a metal monolithic structure with a relatively high thermal mass is used to store the heat of combustion, releasing it slowly between fuel pulses, allowing for regulation of the temperature of the catalyst and the exhaust flowing through the catalyst at a relatively constant level (FIG. 3C). An example of this regulation is shown in FIG. 9, which depicts the average temperature of the catalyst versus time as fuel is added to the gas stream in a pulsed manner as described above. FIG. 9 depicts the catalyst temperature, calculated for a catalyst mass to gas flow ratio of 1250 liters per minute for a catalyst of mass of 1000 grams or 0.8 g/SLPM (standard liter per minute of exhaust flow). The fuel is pulsed to produce a rich-lean periodicity of 0.4 Hz with an equivalence ratio of approximately 3 and typical exhaust conditions of about 10% oxygen. "Rich-lean periodicity" refers to the reciprocal of the time in seconds of a rich plus a lean pulse. For example, a rich pulse of 0.5 seconds plus a lean pulse of 1.5 seconds for a total rich plus lean time of 2 seconds would give a rich-lean periodicity of ½ or 0.5 Hz. The catalyst temperature oscillates between 655 to 681° C. (about a 26° C. variation). This is a large oscillation and could reduce the life of the catalyst structure due to fatiguing of the metal structures. FIG. 10 shows a series of points calculated in the same way but for a wide range of catalyst masses and frequencies. Fuel pulsing above 3 Hz may be difficult to achieve and could introduce high levels of fuel penalty. Frequencies below 0.4 Hz could lead to very high temperature swings for systems with a very small catalyst mass for a given flow, below 0.5 g/SLPM. Thus, the desired rich-lean frequency range for a fuel processor according to the invention is preferably about 0.1 to about 10 Hz, corresponding to a rich-lean time period from about 10 seconds to about 0.1 second, more preferably about 0.25 to about 3 Hz, most preferably about 0.4 to about 2 Hz. In addition, the preferable range of catalyst mass is above about 0.5 g/SLPM. The upper limit of catalyst mass per unit flow is determined by desired start up speed.

In an illustrative example, a typical cylindrical catalyst structure includes a thin 2 mil foil with 300 CPSI (cells per square inch of inlet cross section area), 0.8 mm height channels, a 0.6 mg/cm$^2$ catalyst coating, external dimensions of 2 in diameter by 3 in length, and weight of about 100 g. Increasing the weight to 500 g can be achieved using the same volume by increasing the foil thickness to 10 mil, providing an even more stable temperature profile or the ability to operate the fuel processor at lower frequency of fuel pulses or higher space velocity. Due to the large difference in thermal capacity between the incoming gas stream and the catalyst substrate, a ceramic substrate may also be used.

The channel wall surfaces of a monolithic structure are coated with a layer of catalyst. The coating may be applied as a washcoat. As used herein, "washcoat" refers to a coating applied to a substrate, such as for example a the channel walls of a monolithic structure, typically consisting of a mixture of high exposed surface area support and active catalyst elements. (Heck and Ferrauto, supra) The high surface area support typically includes a porous inert oxide such as alumina or zirconia. The oxide support may include additional components active for oxidation or reforming reactions. A mixture of oxidation and reforming catalysts is used.

As used herein, "oxidation catalyst" refers to any catalyst known in the art that is useful for the oxidation of hydrocarbons in the presence of oxygen. A number of examples of oxidation catalysts that are useful in the present invention are provided in U.S. Pat. No. 5,232,357. Generally, the catalytic composition includes elements of Group VI, VII, VIII, or IB of the periodic table of the elements, or combinations thereof. Active catalytic elements include Pd, Pt, Rh, Cu, Co, Fe, Ni, Ir, Cr, and Mo. Preferably, Pd, Pt, Rh, Co, Fe, or Ni is used. These elements may be used separately or in combination, and either as the pure element or its oxide in actual use. A desirable property for the oxidation catalyst is that it exhibit good catalytic activity at low temperatures, so that the oxidation reaction may be initiated at low temperature. Otherwise, in an embodiment in which the gas stream is the exhaust of an automobile engine, the operation of the engine might have to be modified to raise the exhaust temperature, which would have a negative impact on fuel economy. This property, referred to as "minimum operating temperature," the temperature at which the added fuel begins to react with $O_2$ in the exhaust system, should be below about 250° C., generally below about 150° C. Thus, an oxidation catalyst with low minimum operating temperature is desirable. The oxidation catalyst may be deposited on a support of aluminum oxide, silicon oxide, zirconium oxide, titanium oxide, cerium oxide or a mixture or combination thereof. The catalyst may optionally include other additives or elements. Examples include cerium zirconium oxide mixtures or solid solutions, silica alumina, Ca, Ba, Si, or La stabilized alumina and other supports known in the art.

Use of a large loading of oxygen-storing material or catalytic metals that undergo oxidation/reduction cycles should be avoided, since they could be detrimental to fuel processor performance. Such an added oxygen supply could increase the amount of oxygen available during the transient rich portion of a pulsed fuel cycle, resulting in a higher temperature of operation and reduced fuel efficiency.

The catalyst may be prepared by impregnating Pd, Pt, or other active catalyst material on a porous support such as alumina or zirconia. Metal loading is typically in the range of about 0.1 to about 20%, often about 1 to about 10% by weight of the total washcoat material. An oxidation catalyst for use in processing of added diesel fuel may also contain catalytic components active for steam cracking, since diesel fuel has a high molecular weight and a propensity to pyrolzye at high temperatures. Examples of suitable additives include basic oxides such as calcium oxide, barium oxide, other alkali or alkaline earth oxides, and rare earth oxides.

As used herein, "reforming catalyst" refers to any catalyst known in the art that is useful for production of $H_2$ and CO from a hydrocarbon fuel. Examples of useful reforming catalysts include Ni, Ru, Rh, Pd, and Pt. In the practice of the present invention, the reforming catalyst must be stable under the oxidizing conditions that exist under the normal operation of a lean burn engine and must be able to respond very quickly when fuel is added to reform the hydrocarbon fuel to $H_2$ and CO. Preferably, Pt, Pd, or Rh, or a mixture thereof, is supported on a porous oxide support. An example of a typical catalyst is 1% Rh by weight supported on porous zirconium oxide. This catalyst may be prepared by dissolving rhodium trichloride in water, followed by impregnation of this solution onto zirconium oxide with a high surface area, typically in the range of about 15 to about 150 $m^2/g$. The rhodium concentration is typically in the range of about 0.1 to about 20% of the total washcoat catalyst solid, which includes the rhodium and the oxide support. Often, the rhodium concentration is in the range of about 0.2 to about 10% of the total washcoat loading. The washcoat may be coated onto the interior channels of a monolithic honeycomb structure at a loading or thickness of about 1 to about 50 $mg/cm^2$, often about 5 to about 15 $mg/cm^2$ of interior geometric surface. Pd and Pt catalysts may be prepared in a similar manner.

An oxidation catalyst and a reforming catalyst are combined in the same fuel processor. The oxidation and reforming catalysts may be on separate areas of the same monolithic structure or on separate monolithic structures, or may be combined in the same areas of a single substrate. In one embodiment, the oxidation catalyst is separate from and upstream from the reforming catalyst. In another embodiment, oxidation and reforming catalysts are combined into a washcoat to be applied to the interior channels of a monolithic structure.

In an illustrative example, a Pd oxidation catalyst and a Rh reforming catalyst are combined on a zirconia support to form a catalyst that has the oxidation activity to combust added fuel with $O_2$ in the exhaust stream and the reforming activity to reform the remaining fuel to CO and $H_2$. In one embodiment, the Rh component is impregnated on the high surface area oxide support and then calcined. Separately, the Pd component is coated onto a high surface area support and calcined or fixed. The catalysts are mixed together to form a Pd/Rh oxidation/reforming catalyst. This catalyst can then be used to form a colloidal sol and then washcoated on the monolithic structure. In another embodiment, the monolithic structure is provided with an oxidation catalyst at the inlet and a reforming catalyst at the outlet. In a still further embodiment, the fuel processor includes two separate monolithic structures, one with an oxidation catalyst washcoat layer at the inlet and a second with a reforming catalyst washcoat layer at the outlet.

In some embodiments, the oxidation catalyst and the reforming catalyst compositions include the same catalytically active component(s), for example Pt and/or Pd. In other embodiments, the oxidation and the reforming catalyst compositions include different catalytically active components.

In various embodiments of the invention, a fuel processor includes one or more monolithic structure. In some embodiments, the fuel processor includes one monolithic structure. In other embodiments, the fuel processor includes more than one monolithic structure, stacked or joined together. In some embodiments, a monolithic structure includes one channel from inlet to outlet. In other embodiments, a monolithic structure includes a plurality of channels.

In one aspect, the invention includes a catalyst composition for producing $H_2$ and CO which includes an oxidation catalyst and a reforming catalyst. In another aspect, the invention includes a monolithic structure onto which a catalyst composition including an oxidation catalyst and a reforming catalyst has been coated, or onto which separate oxidation and reforming catalyst compositions have been coated, in the same or different areas of the substrate.

Mixing Section

In $NO_X$ emission control embodiments, the lean NOx catalyst could require a relatively constant concentration of reductant, e.g., $H_2$ and CO, to continuously reduce the NOx to $N_2$. For this reason, a mixer may be provided downstream of the fuel processor to mix the reducing agent with the exhaust flow. This mixing can occur in two separate regions, for example as shown in FIG. 4. The pulses of reductant can be mixed with the lean pulses in region 46 and then this uniform flow can then be mixed with the main exhaust flow in region 50 to produce a relatively uniform mixture of reductant in the exhaust stream at location 47. Alternatively, mixer 46 can be eliminated and the pulsing reductant mixed with the main exhaust flow in region 53. In one embodiment, the gas stream corresponding to several fuel injection cycles is mixed. For example, at a flow of 300 SLPM through fuel reformer 50 and an injection frequency of 1 Hz, the required mixing volume would be about 30 liters for 2 periods (assuming a temperature of 600° C., which results in a gas expansion of 3 fold). The higher the operating frequency, the smaller the mixing volume needs to be to mix the $H_2$ pulses into a steady concentration. The mixing container must be catalytically inert to avoid combustion of $H_2$. To further avoid this possibility, the walls of the mixing container may be cooled, or the exhaust may be cooled, for example via a heat exchanger, before entering the mixing section of the apparatus.

Alternatively, the lean NOx catalyst could require pulses of $H_2$ and CO for optimum performance. In this case, the mixer 46 in FIG. 4 would be eliminated and mixer 53 would be designed to mix the reductant with the main exhaust flow radially but to minimize axial mixing to retain the pulses of reductant. As discussed in Example 4 and shown in FIG. 12, some lean NOx catalysts perform better with pulses of reductants rather then continuous reductant concentrations. The pulses of reductant produced in accordance with the invention may be maintained with a system designed to minimize axial mixing, thereby maximizing the pulses of reductant flowing through the lean NOx catalyst wherein NOx is reduced to $N_2$.

Lean $NO_X$ Catalyst

In some embodiments, the apparatus of the invention includes a lean $NO_X$ catalyst, depicted as 48 in FIG. 4, for reduction of $NO_X$ with the reductant produced in the fuel processor. The lean $NO_X$ catalyst must possess good selectivity for this reaction in the temperature window of operation and a low activity for $H_2$ combustion. In one embodiment, a catalytic structure containing the lean $NO_X$ catalyst contains a combination of catalyst formulations, with a high temperature formulation at the inlet (or outer layer for multi-layered geometry) and a low temperature formulation at the outlet (or inner layer) of the catalytic structure.

Typical active catalytic components of the lean $NO_X$ catalyst include Pt, Pd, Rh, and Ir. High surface area refractory oxide supports or zeolites may be included. Typical refractory oxide supports are alumina, alumina with additives such as Si, Ca, Ba, Ti, La or other components to provide increased thermal stability. The high surface area support may be similar to those discussed above for the fuel processing oxidation/reforming catalysts. In addition, modifying components such as, for example, Na, Co, Mo, K, Cs, Ba, Ce, and La, may be used to improve the selectivity of the reaction, by reducing the oxidation activity of the catalyst. Examples of useful lean $NO_X$ catalyst compositions are discussed in U.S. Pat. No. 6,109,018.

Figure 12:
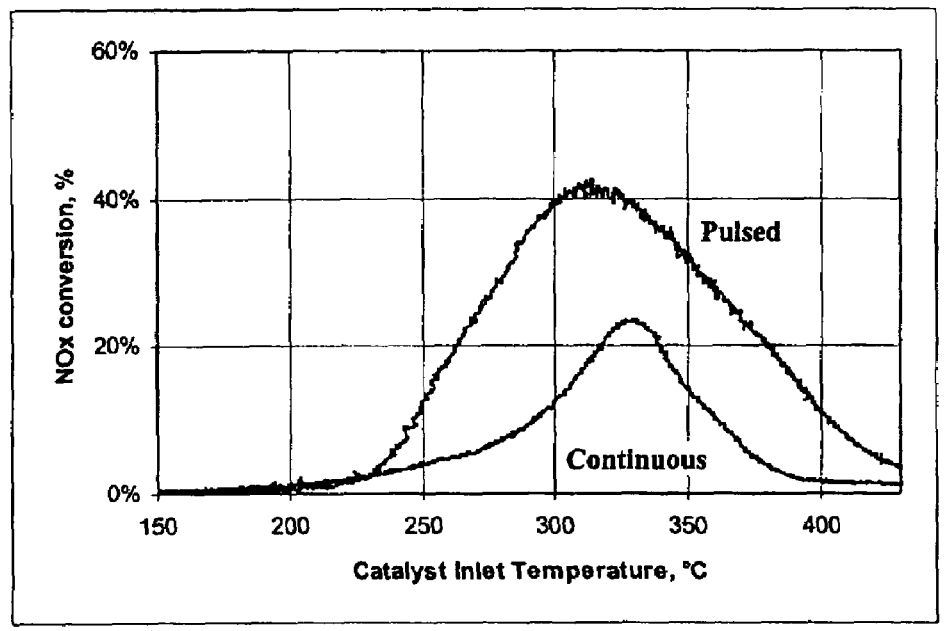
FIG. 12 shows the results of an experiment to compare the efficiency of $NO_X$ conversion using pulsed versus continuous addition of reducing agents $H_2$ and CO to a flowing gas stream through a lean $NO_X$ catalyst.

In general it has been found that a relatively constant flow of reductant is used to reduce NOx in the lean NOx catalyst. Surprisingly, we have found that varying concentration of $H_2$ and CO gives improved NOx reduction. This is shown in FIG. 12 where NOx reduction is measured for a relatively continuous concentration of $H_2$+CO and a pulsing concentration of $H_2$+CO. This catalyst, described in Example 4, consists of platinum and molybdenum supported on a high surface area alumina and deposited as a washcoat onto a cordierite monolith. The pulsing concentration of $H_2$+CO results in a higher level of $NO_X$ conversion with the $NO_X$ conversion occurring over a much wider temperature range.

In some embodiments, unreacted CO may be removed by including an oxidation catalyst downstream of the lean $NO_X$ catalyst, typically a low temperature oxidation catalyst. In some embodiments a low minimum operating temperature formulation is used.

Control Strategies

A number of control strategies may be used to optimize efficiency of the emission control system of the invention. Several typical strategies include:

Using one or more parameters including NOx concentration upstream of the catalyst, NOx concentration downstream of the catalyst, oxygen concentration in the exhaust, exhaust gas temperature, exhaust flow rate, engine torque, engine rpm, engine turbocharger boost, engine fuel flow, engine intake air flow, or a variety of other engine operating parameters to calculate the required fuel flow to the fuel injector and the injector duty cycle.

Using a NOx sensor downstream of the lean NOx catalyst and then adding fuel to the fuel processor to obtain the desired level of NOx Using a NOx sensor upstream of the lean NOx catalyst combined with engine operating parameters to estimate the total exhaust flow. Combining the NOx concentration with one or more of other parameters including the exhaust flow, exhaust oxygen level and exhaust temperature will permit an estimate of the required fuel flow to reduce this NOx flux.

Using an engine map of NOx production rate or concentration versus engine operating parameters such as but not restricted to rpm, torque, load, or turbocharger boost. Engine parameters can also be used to estimate the exhaust flow and therefore total NOx flux and the required fuel flow to reduce this NOx flux. The engine operating parameters could include rpm, engine torque, engine turbocharger boost, engine fuel flow, engine intake air flow, exhaust temperature or a variety of other engine operating parameters.

The control strategy could also include the use of measured or estimated exhaust temperature to estimate the fuel required to obtain the desired temperature rise. This could be combined with any of the above control strategies.

Adjustable parameters used to control the level of $H_2$ produced and the fuel processor catalyst operating temperature include flow rate of the added hydrocarbon fuel during the rich portion of the cycle, the flow rate of the added hydrocarbon fuel during the lean portion of the cycle, the level of oxygen in the gas or exhaust stream which can be controlled or varied by engine exhaust gas recirculation (EGR) flow rate or intake air throttle setting, the frequency of the lean and rich pulses, and duty cycle (fraction of total cycle in which fuel injection is "on"). For example, the desired flux of $H_2$, for example in moles per minute, $FH_2$, would be a function of the flux of NOx in the exhaust stream, also for example in moles per minute, $F_{NOx}$, with the functional relationship being dependent on the performance of the lean NOx catalyst as shown for example in Eqn. 1.

$$F_{H2}=f(F_{NOx}) \hspace{2cm} \text{Eqn. 1}$$

This functional relationship could be determined by engine tests or rig tests of the catalyst covering the expected process variables some of which may be catalyst temperature, $T_{cat}$, exhaust gas temperature, $T_{exh}$, exhaust oxygen level, $C_{O2}$, exhaust water concentration, $C_{H2O}$, age of the catalyst, $A_{cat}$, etc. The functional relationship could be of the form where one or more of the dependent variables are included in the functional relationship as shown in Eqn. 2.

$$F_{H2}=f(F_{Nox}, T_{cat}, T_{exh}, A_{cat}, C_{O2}, C_{H2O}, A_{cat}) \hspace{1cm} \text{Eqn. 2}$$

The flux of $H_2$ required in the exhaust stream, defined by Eqn. 2 will be determined by the rate of fuel fed to the fuel processor, $F_{fuel}$, so the rate of fuel feed can be defined as a function of the desired $H_2$ flux, $F_{H2}$, as expressed in Eqn. 3.

$$F_{fuel}=f(F_{H2}) \hspace{2cm} \text{Eqn. 3}$$

However, since the fuel flow must be sufficient to combust the oxygen and raise the fuel processor catalyst temperature, the rate of fuel feed to the fuel processor will also be a function of the exhaust gas temperature, $T_{EXh}$, and the desired operating temperature of the fuel processor catalyst in the rich zone, $T_{Fp}$, the fraction of exhaust gas that flows through the fuel processor, $F_{FP}$, the oxygen concentration in the exhaust stream, $C_{O2}$, and the total exhaust flow rate, $F_{exh}$, and possibly other variables. Thus, fuel flow rate could be calculated from a functional relationship such as Eqn. 4 where one or several of the dependent variables are actually used in the functional relationship.

$$F_{fuel}=f(F_{H2}, T_{Exh}, T_{FP}, F_{FP}, F_{exh}, C_{O2}) \hspace{1cm} \text{Eqn. 4}$$

Many of the variable in Eqn. 3 are a function of the engine operating condition. For example, exhaust flow rate, exhaust temperature and concentration of oxygen in the exhaust could be a function of the engine operating conditions including engine rpm, $E_{rpm}$, engine torque, $F_{trq}$, engine turbocharger boost, $E_{bst}$, engine fuel flow rate, $E_{fuel}$, engine intake air flow rate, $E_{air}$, engine EGR flow rate, $E_{EGR}$, engine throttle setting, $E_{thr}$, and possibly other variables. Thus, some of the variables in Eqn. 3 could be replaced by some of these engine parameters and these used in the control logic to determine the desired fuel flow rate, $F_{fuel}$. This could be an advantageous method of control since the engine control computer or engine control unit, ECU, may already be measuring or calculating many of these values or in fact maybe setting them for correct operation of the engine. For example current engines measure rpm, engine torque, turbocharger boost and many other variables and control or set such variables as EGR flow rate, fuel flow rate, turbocharger boost, etc.

In an alternative control strategy, the engine could be mapped over the entire engine operating range of rpm and torque and include such variables as inlet air temperature or ambient temperature. Over these operating ranges, the exhaust composition including oxygen concentration, NOx concentration, exhaust flow rate, exhaust temperature and may other important variables could be determined and a map generated that would specify the value of fuel flow required. This map or look up table could then be used to determine the required fuel flow rate at any engine operating condition. This fuel flow rate would then be used to set the fuel flow rate during the rich pulse and the duty cycle. Alternatively, a combination of these strategies could be used. For example, engine operating parameters could be used to determine the NOx concentration in the exhaust stream using a fast look up table. Then, a simple functional relationship could be used to calculate the fuel feed rate based on some engine parameters such as rpm, torque, EGR flow rate or setting, inlet throttle setting and turbocharger boost pressure or some subset of these parameters.

In most applications, the engine will operate in a transient manner with the engine rpm and torque varying with time. Control of the fuel injection rate in these cases will be similar or may require the addition of a delay period based on the rate of change of certain engine operating parameters. For example, as engine rpm is increased, the exhaust flow rate will increase and therefore the fuel flow required to maintain the fuel processor catalyst temperature will increase. However, some delay in the fuel flow may be required since the exhaust flow rate increase may lag behind the actual rpm increase. Similarly, as torque increases, $NO_X$ level and exhaust flow may increase and fuel flow to the fuel processor may need to be increased, but both of these parameters may be delayed compared to the steady state engine operating parameters. The fuel flow to the fuel processor catalyst may need to be adjusted so that temperature rise through the fuel processor catalyst and the amount of reductant produced effectively match the actual fuel processor catalyst inlet temperature and the level of $NO_X$ entering the lean $NO_X$ catalyst.

The following examples are intended to illustrate, but not limit the invention.

EXAMPLES

Example 1

Catalyst Preparation

A monolithic structure was prepared as described in U.S. Pat. No. 5,259,754.

Palladium nitrate was diluted in deionized water at a concentration of about 0.18 g Pd/ml and then zirconium oxide powder having a surface area of about 75 $m^2$/g was added with stirring. The mixture was then evaporated to dryness and the resulting powder calcined in air at 700° C. for 10 hours. The final palladium concentration in the final catalyst powder was 5.5% by weight. The Pd/$ZrO_2$ catalyst was slurried with water and 10% by weight of a 20% zirconium acetate solution to form a slurry of about 30% solids. The Pd concentration in the solid oxide was 5%.

Rhodium trichloride was dissolved in deionized water at a concentration of about 0.04 g Rh/ml and then zirconium oxide powder with a surface area of about 75 $m^2$/g was added with stirring. While stirring the mixture, a solution of 20% ammonium hydroxide in water was added to a pH of 8. the mixture was then evaporated to dryness and the resulting powder calcined in air at 700° C. for 10 hours. The final rhodium concentration in the final catalyst powder was 1.1% by weight. The Rh/$ZrO_2$ catalyst was slurried with water and 10% by weight of a 20% zirconium acetate solution to form a slurry of about 30% solids. The Rh concentration in the solid oxide was 1%.

A strip of River Lite 20-5Sr from Kawasaki Steel Company with a thickness of 0.050 mm, width of 75 mm, and length of 3 m was corrugated to form V-shaped channels in a herringbone pattern. The channels were approximately 10 mm in width and 1.46 mm in height with an angle between the herringbone sections of 15 degrees. The corrugated foil was heated in air at 900° C. for 10 hours to form a layer of aluminum oxide on the surface. The Pd/$ZrO_2$ slurry was sprayed onto the foil to form a catalyst coated layer 25 mm wide along the 3 m length on both sides of the corrugated foil coating the same section of the foil on both sides. The catalyst layer had a loading of 6 mg/$cm^2$ of the geometric foil metal surface. The Rh/$ZrO_2$ slurry was then sprayed onto the remaining uncoated metal surface on both sides of the foil to a loading of approximately 6 mg/$cm^2$. The coated catalyst was then calcined in air at 700° C. for an additional 10 hours. The foil was then folded in half and rolled to form a non-nesting spiral roll with open longitudinal channels. The final catalyst had a diameter of 50 mm and contained about 13 g of catalyst washcoat.

Example 2

Catalytic Conversion of Fuel Injected at Varying Frequencies to $H_2$

The catalyst from Example 1 was placed in a flow reactor containing a gas supply and mass flowmeters for air, $N_2$ and He as a mass spectrometer quantitative tracer, an electric heater, an air assist sprayer for water, and a pressurized fuel sprayer for diesel fuel injection (Mitsubishi MR560553). The catalyst was located in a 50 mm diameter insulated section with thermocouple temperature sensors upstream and downstream of the catalyst. A sampling probe for a mass spectrometer was located about 50 cm downstream of the catalyst outlet.

Figure 6:
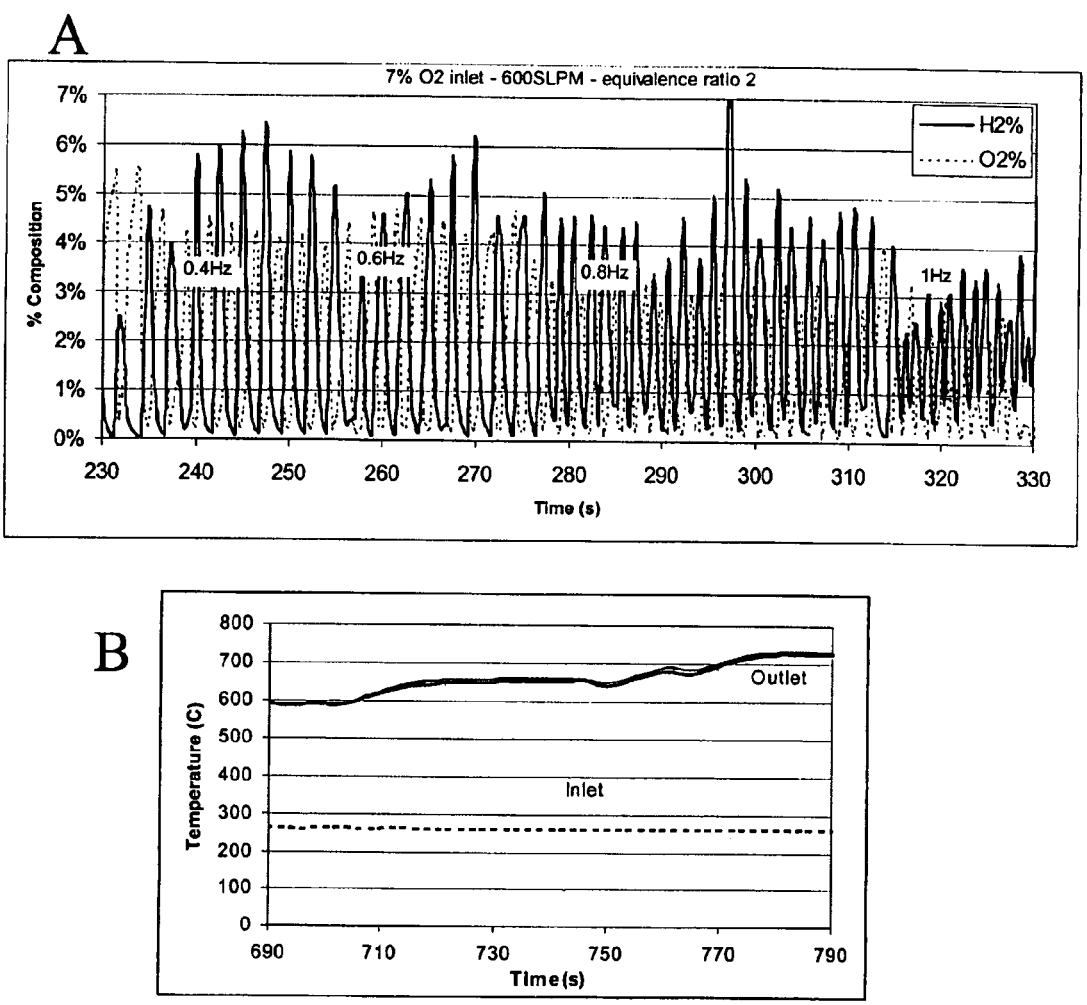
FIG. 6 shows the results of an experiment in which pulses of fuel were used to catalytically produce $H_2$ in the presence of 7% $O_2$.

The flow of air, nitrogen, and water was adjusted to a total gas flow rate of 600 SLPM, forming a final composition of 5% $H_2O$, 7% $O_2$, 0.3% He, and the balance $N_2$. This mixture was then heated to 270° C. using the electric heater. Diesel fuel was injected in pulses of varying frequency, as shown in FIG. 6. The mass spectrometer sampling rate was 2 Hz, and the injection frequency varied between 0.4 and 1 Hz. FIG. 6A depicts the $O_2$ and $H_2$ concentrations as a function of time and fuel pulse frequency, converted to concentration units of percent of volume. The sampling point for this location was just downstream of the fuel processor unit equivalent to sampling at location 7 in FIG. 2. During pulses of fuel injection, all of the $O_2$ present during the fuel "on" phase is consumed and $H_2$ is produced. FIG. 6B depicts the temperature of the gas at the outlet of the catalyst, measured by three thermocouples placed immediately downstream of the catalyst at different locations across the outlet face. Previous work has shown that the gas temperature responds very rapidly to any change in the catalyst temperature. The temperature of the gas stream exiting the fuel processor is very constant showing no oscillations from the pulsing fuel and thus demonstrating the inventive concept that the thermal mass of the catalyst can be used to dampen the oscillations from pulses of fuel. At 0.4 Hz, the temperature is approximately 600° C. and rises to about 725° C. as the frequency is increased to about 1 Hz. This rise in temperature is due to reaction of increasing amounts of $O_2$ with the fuel resulting in a larger heat release.

Example 3

Effect of Mixing to Provide a Continuous Stream of $H_2$ and CO

Figure 7:
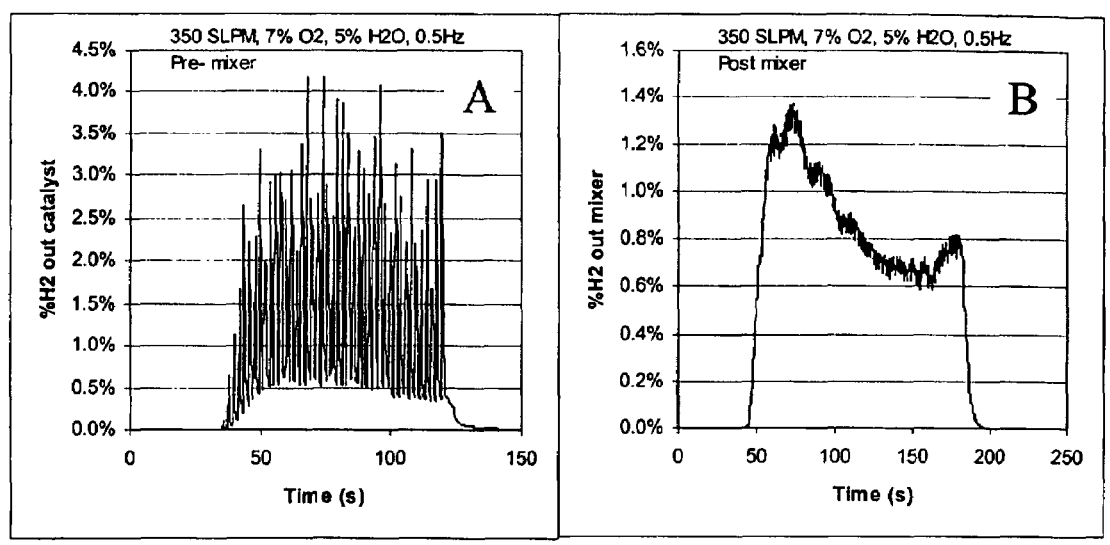
FIG. 7 shows the effect of mixing on $H_2$ concentration over time.

An experiment similar to Example 2 was performed, but using 22 g catalyst with an 8 mm channel foil height, at a flow rate of 350 SLPM. Fuel pulses were at 0.5 Hz. After exiting the fuel processor catalyst, the resulting gas stream then entered a 38 liter stainless steel mixing chamber, to mix the resulting products. A mass spectrometer was used to follow the composition of the gas stream just downstream of the fuel processor, equivalent to location 7 in FIG. 2 and just downstream of the mixing volume, equivalent to location 10 in FIG. 2. The $H_2$ concentration just downstream of the fuel processor is shown in FIG. 7A and the $H_2$ concentration downstream of the mixing volume is shown in FIG. 7B. These data show that such a mixing volume is sufficient to mix out the pulsing $H_2$ and provide a stream of gas with a relatively constant level of $H_2$. It should be noted that CO was not monitored in these tests but the CO concentration is expected to show the same behavior as the $H_2$.

Example 4

Effect of Pulsing and Continuous Reductant on NOx Conversion

A lean NOx catalyst was prepared as follows. A gamma alumina powder with a surface area of about 250 m²/g was impregnated with ammonium heptamolybdate dissolved in de-ionized water and the powder dried and calcined at 600° C. to form a final Mo loading on the alumina of 10% by weight. This powder was then impregnated with platinum nitrate solution, dried and calcined at 600° C. to form a final Pt loading of 0.5%. This final solid was then milled in a ball mill with water to form a sol of about 30% solids by weight and this sol coated onto a cordierite monolith and dried and calcined at 600° C. to form a final structure that contained about 15% of the sol as a washcoat. A 25 mm diameter by 75 mm cylinder of this catalyst was placed in a test system that had a flowing gas stream at 25 liters per minute containing 10% $O_2$, 8% $CO_2$, 5% $H_2O$, 10 ppm $SO_2$ and 600 ppm NO. Into this stream was added $H_2$ and CO to form a concentration in the flowing gas stream of 6000 ppm of $H_2$ and 3000 ppm of CO. This $H_2$ and CO was added either as a continuous flow or injected at about 0.3 seconds every 1 second. The NOx level downstream of the lean NOx catalyst was monitored and as the lean NOx catalyst temperature was varied from 150 to 425° C., the NOx conversion curves shown in FIG. 12 were obtained. Pulsing or varying levels of $H_2$ and CO show a substantially improved NOx conversion.

Although the foregoing invention has been described in some detail by way of illustration and examples for purposes of clarity of understanding, it will be apparent to those skilled in the art that certain changes and modifications may be practiced without departing from the spirit and scope of the invention. Therefore, the description should not be construed as limiting the scope of the invention, which is delineated by the appended claims.

All publications, patents and patent applications cited herein are hereby incorporated by reference for all purposes and to the same extent as if each individual publication, patent or patent application were specifically and individually indicated to be so incorporated by reference.

We claim:

1. A method of forming reformate from diesel engine fuel in a diesel engine exhaust stream, comprising:
    channeling a lean exhaust flow from the engine through a fuel processor, the fuel processor comprising a main chamber and a fuel reforming catalyst within the main chamber;
    dividing the lean exhaust flow within the main chamber between a first flow path through the catalyst, or a portion thereof, and a second flow within the main chamber that bypasses the first flow path, with the split ratio of the division between the two flow paths being unregulated or regulated only by fixed means;
    injecting the diesel fuel into the first flow path to form an overall rich composition within the first flow path while maintaining a lean composition in the bypass flow;
    reforming a portion of the injected fuel to form $H_2$ and CO within the first flow path; and
    causing the the divided exhaust flow to recombine.

2. The method of claim 1, wherein the recombined stream is channeled through a lean $NO_x$ catalyst that reduces $NO_x$ contained in the recombined exhaust stream under lean conditions using the $H_2$ and CO.

3. The method of claim 1, wherein the second flow path bypasses the catalyst.

4. The method of claim 1, wherein the split ratio is unregulated.

5. The method of claim 1, wherein the fuel processor produces $H_2$ and CO at least in part through steam reforming reactions;
    wherein steam reforming comprises endothermic reaction with $H_2O$ at temperatures of at least about 550° C.

6. The method of claim 5, wherein at least a portion of the injected fuel is oxidized within the first flow path to provide energy that heats at least a portion of the catalyst to reach or maintain steam reforming temperatures of at least about 550° C.

7. The method of claim 1, wherein from about 5 to about 25% of the exhaust is continuously diverted through the first flow path.

8. The method of claim 1, wherein the fuel injection is set based on the exhaust oxygen concentration to produce a target reductant amount in the first flow path.

9. The method of claim 8, wherein the target reductant amount is independent of the exhaust oxygen concentration.

10. A power generation system comprising:
    an engine operative to produce an exhaust stream;
    an exhaust system comprising a fuel processor configured to receive the exhaust stream, the fuel processor comprising a main chamber and a fuel reforming catalyst within the main chamber, the fuel processor having a fixed structure for dividing the exhaust stream between a first flow path through the catalyst, or a portion thereof, and a second flow within the main chamber that bypasses the first flow path, with the spilt ratio of the division between the two flow paths being unregulated or regulated only by the fixed structure, the exhaust system being structured to recombine the divided exhaust stream downstream from the catalyst; and
    a fuel injector configured to inject fuel into the first flow path without simultaneously injecting fuel into the bypass flow path, whereby the fuel injector is functional to produce rich conditions in the first flow path while conditions remain lean in the bypass flow.

11. The power generation system of claim 10, further comprising a lean $NO_x$ catalyst within the exhaust system downstream from where the exhaust stream recombines.

12. The power generation system of claim 10, wherein the second flow bypasses the catalyst.

13. The power generation system of claim 10, wherein the fuel processor is adapted to produce $H_2$ and CO at least in part through steam reforming reactions;
   wherein the adaptations comprise a control system for heating the catalyst to temperatures of at least about 600° C. and the catalyst being effective for reforming partially combusted diesel fuel with $H_2O$ to produce $H_2$ and CO at 600° C.

14. The power generation system of claim 10, wherein the first flow path comprises an oxidation catalyst configured to combust injected fuel to provide energy to heat the catalyst to reach or maintain steam reforming temperatures of at least about 550° C.

15. The power generation system of claim 10, wherein the exhaust system is configured to fixedly direct from about 3 to about 30% of the exhaust through the first flow path.

16. The power generation system of claim 10, further comprising a controller that controls the fuel injection into the first flow path based on an amount of oxygen in the exhaust entering the first flow path, wherein the controller does not control the exhaust flow rate through the first flow path.

17. The power generation system of claim 10, wherein:
   the catalyst comprises distinct oxidation and reforming catalyst washcoats;
   the reforming catalyst washcoat comprises an effective amount of catalyst for reforming partially combusted diesel fuel with $H_2O$ to produce $H_2$ and CO at 600° C.

18. The power generation system of claim 17, wherein the oxidation and reforming catalyst are distinct washcoats on a single monolith catalyst support structure.

19. The power generation system of claim 17, wherein the oxidation catalyst washcoat comprises an effective amount of Pd for oxidizing diesel fuel at 250° C. and the reforming catalyst washcoat comprises an effective amount of Rh for reforming diesel fuel with $H_2O$ at 600° C.

* * * * *